235-379 SR
5/14/85 OR 4,517,451

United States Patent [19]
Kokubo et al.

[11] Patent Number: 4,517,451
[45] Date of Patent: May 14, 1985

[54] NOTE TRANSFER MECHANISM IN AUTOMATIC MONEY DEPOSITING AND DISBURSING MACHINE

[75] Inventors: Eiichi Kokubo; Junichi Arikawa; Kowichi Goi; Shinichi Imura, all of Tokyo, Japan

[73] Assignee: Laurel Bank Machine Co., Ltd., Tokyo, Japan

[21] Appl. No.: 427,607

[22] Filed: Sep. 29, 1982

[30] Foreign Application Priority Data

Oct. 15, 1981 [JP] Japan ............................... 56-164436

[51] Int. Cl.³ ............................................ G06F 15/30
[52] U.S. Cl. ...................................... 235/379; 209/534
[58] Field of Search ......................... 235/379; 209/534

[56] References Cited

U.S. PATENT DOCUMENTS 4,236,639 12/1980 Boettge .............................. 209/534

FOREIGN PATENT DOCUMENTS 56-33757 4/1981 Japan .
56-83875 7/1981 Japan .

*Primary Examiner*—David L. Trafton
*Attorney, Agent, or Firm*—Fleit, Jacobson, Cohn & Price

[57] ABSTRACT

An automatic money depositing and disbursing machine has functions of receiving bank notes from a transacting port and feeding the same through a discriminating section provided in a note circulating delivery passage and accommodating in the boxes normal notes judged by the discriminating section, and of disbursing the notes through the discriminating section from the transacting port. The machine is of such a construction that at least portions of the received notes are used as notes to be defrayed or disbursed. Provided between the note circulating delivery passage and the boxes are note transfer mechanism which comprises at least one upwardly retraction accumulating wheel for feeding notes into the boxes from the note circulating delivery passage and at least one pair of attracting drums for sucking notes from the boxes and feeding them to the note circulating delivery passage. The machine has a judging section for checking a near-end condition. The machine also may have a fullness detecting mechanism for checking notes accumulated in boxes in a full condition. The machine also may have an uppermost surface position detecting mechanism for checking whether the uppermost surface position of notes is set in a position.

3 Claims, 28 Drawing Figures

(A)

(B)

CONVEYANCE OF NOTES FROM 1st ACC. SEC. TO TRANS. PART.
S96
OPENING OF TRANSACTING PORT
S97
IS WITHDRAWAL COMPLETED
S98
YES
NO
DOES RESIDUAL TIME PASS
S99
YES
NO
CLOSING OF TRANSACTING PORT
S100
CONVEYANCE AND ACCOMMODATION OF RESIDUAL NOTES FROM TRANS. PORT TO REJECT BOX
S101
CLOSING OF TRANSACTING PORT
S102
SETTING OF 2nd REC. SEC. IN INITIAL POSITION
S103
END

NOTE TRANSFER MECHANISM IN AUTOMATIC MONEY DEPOSITING AND DISBURSING MACHINE

BACKGROUND OF THE INVENTION

The present invention relates to an automatic money depositing and disbursing machine in which deposited notes are circulated and utilized again as notes to be defrayed. More particularly, the present invention relates to a mechanism for monitoring a quantity of notes accumulated in note accumulating boxes and a mechanism for making an initial setting of the monitoring mechanism for use in the automatic money depositing and disbursing machine.

The conventional automatic money depositing and disbursing machine has depositing and disbursing functions independently. Namely, the conventional automatic money depositing and disbursing machine is required to have a depositing function of discriminating, one by one, received notes inserted in a receiving section receiving the notes judged as being true notes and returning the notes judged as being not true notes, and a disbursing function of temporarily storing notes to be disbursed, which are fed from a disbursing box while detecting double feeding and incorporation of different kinds of notes, disbursing the notes when a predetermined number of notes are stored without detection of any disorder, and feeding the normal notes already stored and notes judged as being abnormal notes to a reject body when a disorder is detected before a predetermined number of notes are stored and repeating the disbursing operation from the beginning.

The sections for performing the above-mentioned depositing and disbursing functions should be arranged completely independently from each other so as to avoid incorporation of deposited notes and disbursed notes. Accordingly, it is considered that depositing and disbursing units having the above functions, respectively, are constructed independently and they are combined together to form an automatic money depositing and disbursing machine. However, if both the depositing and disbursing units are simply combined together, the size of the automatic money depositing and disbursing machine is increased and the structure is complicated.

In order to eliminate this disadvantage, there has been proposed a machine in which deposited notes are sorted and contained in note boxes arranged for the respective kinds of notes and the notes contained in these boxes are delivered and utilized as notes to be defrayed, for example, a circulation type money depositing and disbursing machine disclosed in Japanese Patent Application Laid-Open Specification No. 33757/81. However, circulation of deposited notes for utilizing them as notes to be defrayed has already been performed manually, and a problem how to perform circulation effective is still kept unsolved.

In the technique disclosed in Japanese Patent Application Laid-Open Specification No. 33757/81, there is adopted a method in which received true notes are distributed into note boxes for the respective kinds from above and are accumulated therein and at the time of disbursement, the accumulated notes are delivered out one by one from the lower notes by utilizing the gravity of the notes. In this conventional technique, depositing and disbursing openings should be formed on the upper and lower portions of each note box, and the structure becomes complicated. Furthermore, in order to circulate notes, it is necessary to arrange a passage for delivering upward notes delivered out from the lower portion of the note box, and the note box should be attached and drawn out so that the note box does not intersect this delivery passage. Accordingly, the direction of attaching and drawing out the note box is limited to one direction.

According to the setting condition, automatic money depositing and disbursing machines are divided into two types, that is, the lobby type (the machine is set mainly in a lobby of a bank and note boxes are attached from the side where a customer performs the operation) and the embodded type (the machine is set mainly in an unmanned store or corner, only the portion for the operation of the customer is arranged on the machine-embedded wall and note boxes are attached from a different room on the inner side of the wall). If the direction of attaching and drawing out the note boxes is limited to one direction, the automatic money depositing and disbursing machine can be used for only the lobby type or the embedded type. Therefore, automatic money depositing and disbursing machines or both the types should be independently arranged for the respective uses exclusively, resulting in increases of the costs. Moreover, the adaptability to changes of setting conditions are very poor.

In the technique disclosed in Japanese Patent Application No. 141315/81, there is provided an automatic money depositing and disbursing machine in which a note transfer mechanism for feeding notes into boxes from above and containing the notes therein and also for delivering upward the notes contained in the boxes and feeding the notes into a note circulating delivery passage is arranged below the note circulating delivery passage for circulating deposited notes and utilizing them as notes to be defrayed, and a plurality of boxes are independently arranged so that the boxes can be drawn out in optional directions.

SUMMARY OF THE INVENTION

It is, therefore, an object of the invention to provide an automatic money depositing and disbursing machine in which notes are received in and disbursed out through upper openings of boxes, said machine being provided with a mechanism for monitoring a quantity of notes accumulated in boxes and a mechanism for making its initial setting.

In accordance with the present invention, there is provided an automatic money depositing and disbursing machine in which notes thereon in a transacting port are transferred into a discriminating section to detect the presence or absence of abnormal notes and receive normal notes and at least portions of the received notes are used as notes to be defrayed, which comprises: at least one pressing member movably supported to be vertically moved toward an upper opening of each note accumulating box, a pulse driven motor connected to the pressing member through a connecting mechanism for vertically moving and setting the pressing member in a position by forward and reverse rotation pulses, a position data memory for renewing memorized position data for the pressing member by adding the forward rotation pulses to the position data or subtracting the reverse rotation pulses from the position data, and a judging section for issuing a near-end signal by the position data for the pressing member memorized in the position data memory when the quantity of notes accumulated in each box becomes less than a previously set quantity of notes.

DESCRIPTION OF THE DRAWINGS

The present invention will now be described in detail by reference to embodiments illustrated in the accompanying drawings in which.

DESCRIPTION OF THE PREFERRED EMBODIMENT

The present invention will now be described in detail with reference to the accompanying drawings.

Figure 1:
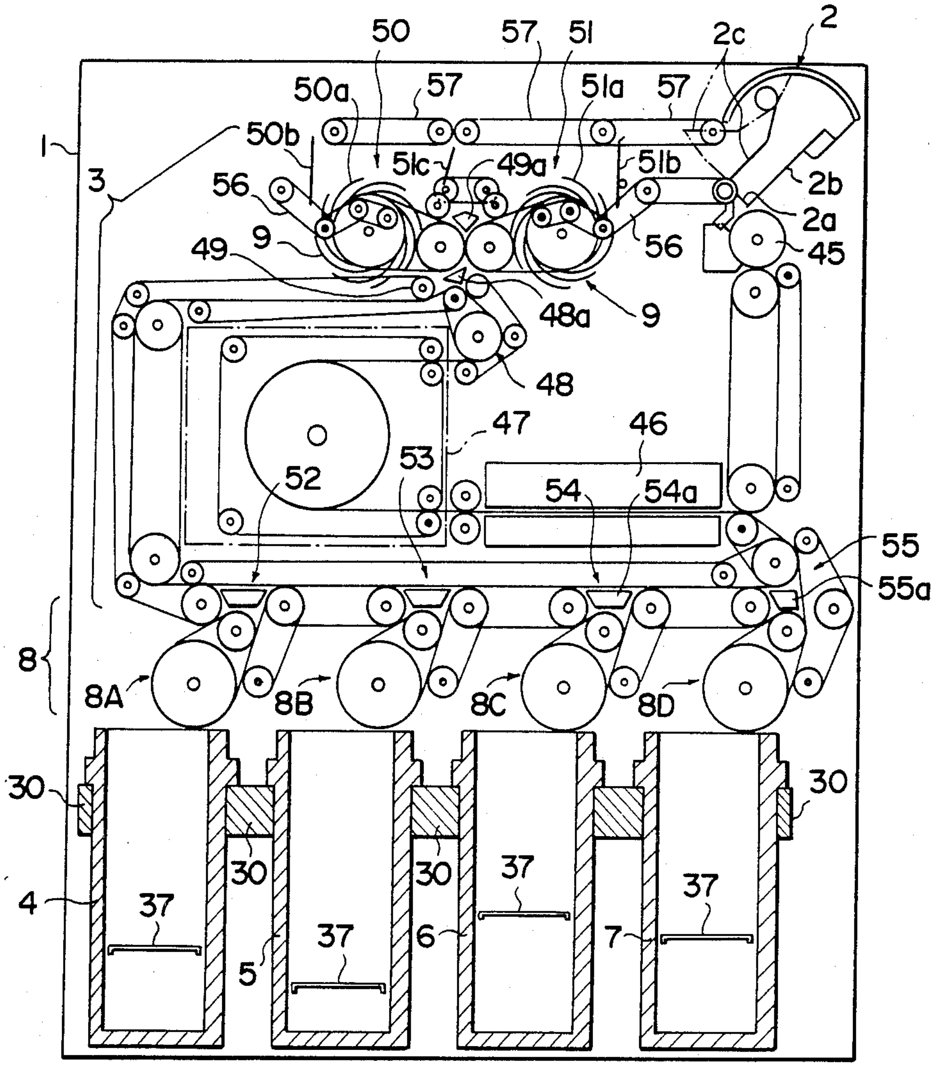
FIG. 1 is a diagrammatical side view showing a whole structure of one embodiment of an automatic money depositing and disbursing machine according to the present invention.
Figure 2:
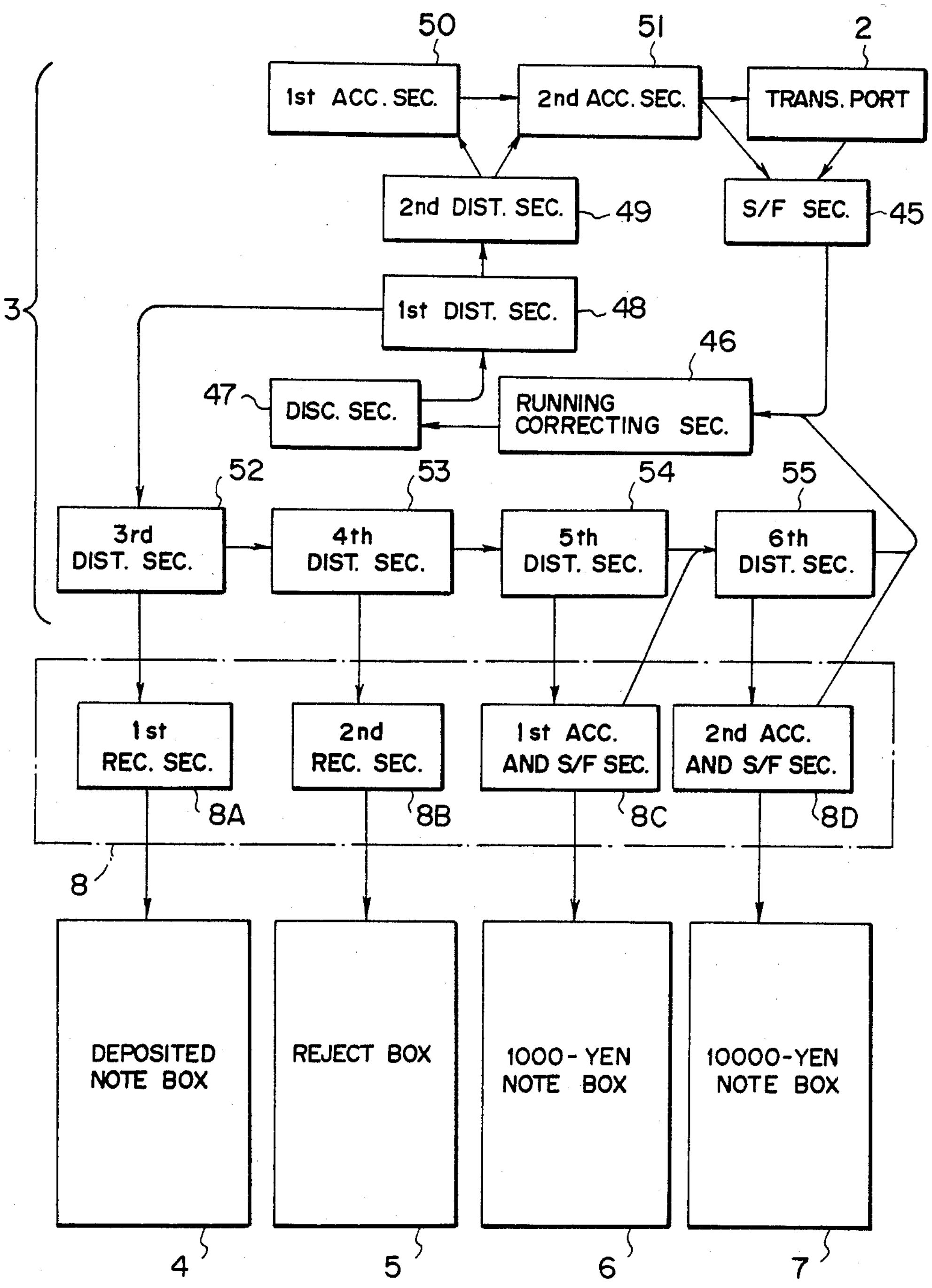
FIG. 2 is a block diagram showing the flow of notes circulated through respective sections shown in FIG. 1.

FIG. 1 is a diagrammatical side view showing a whole structure of one embodiment of the automatic money depositing and disbursing machine to which the present invention is applied, and FIG. 2 is a block diagram showing a system of flow of notes through respective structural elements.

In the automatic money depositing and disbursing machine of this embodiment, operations of charging notes to be deposited and receiving notes to be disbursed are performed by customers through a transacting port 2 arranged on one side of a machine body 1 (transacting ports may be arranged on both the sides of the machine body), and while these notes are circulated and delivered through a note circulating delivery passage 3, note boxes 4 through 7 located in the lower portion of the machine body 1 are mutually connected to the transacting port 2 through the note circulating delivery passage 3.

Various means are disposed in the machine to exert the respective functions described above. In this embodiment, the note boxes 4 through 7 are connected to the note circulating delivery passage 3 through a note transfer mechanism 8 arranged above the note boxes 4 through 7. This note transfer mechanism 8 is divided, as shown in FIG. 2, into a first receiving section 8A, a second receiving section 8B, a first accumulating and separating feed section 8C and a second accumulating and separating feed section 8D so that the boxes 4 through 7 are connected to the note circulating delivery passage 3 independently. Accumulating wheels 9 are arranged to receive notes from the note circulating delivery passage 3 and let them fall down into the boxes 4 through 7, respectively. The accumulating wheel 9 has such a structure that it can be retreated upward if necessary.

Figure 3:
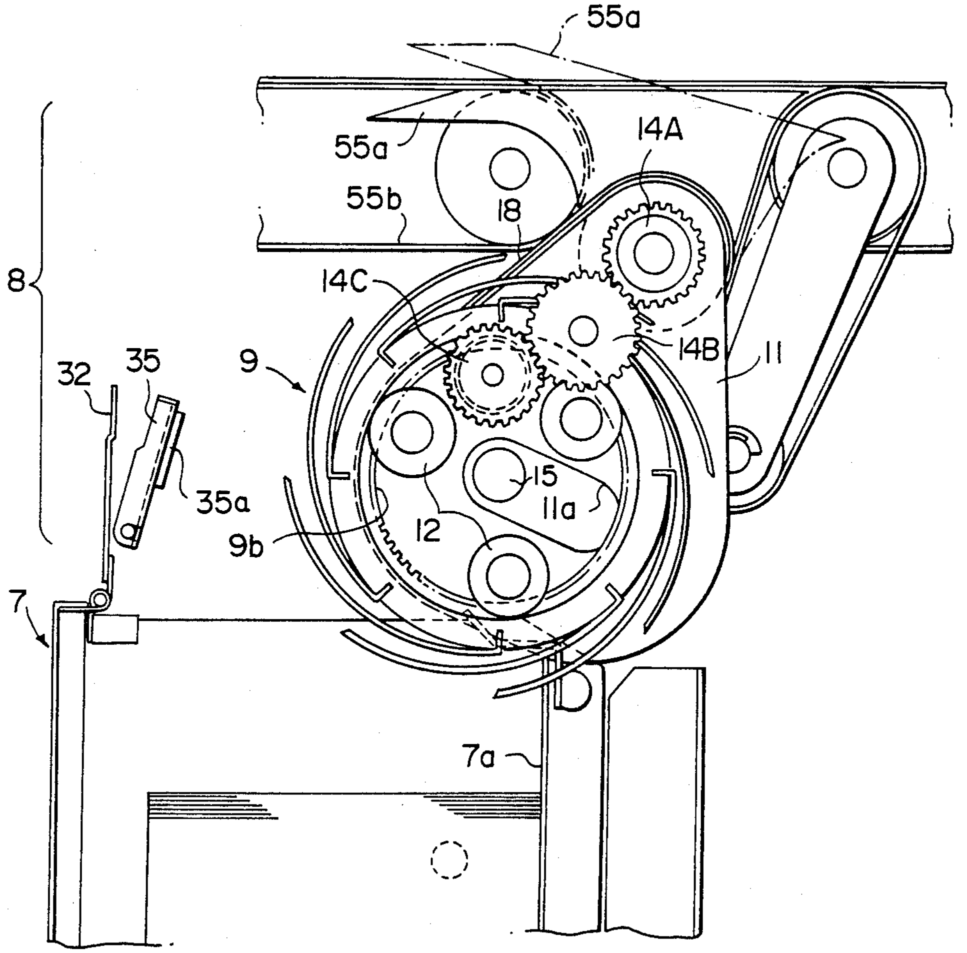
FIGS. 3A and 3B are side views showing a structure of a note transfer mechanism of the automatic money depositing and disbursing machine.
Figure 3:
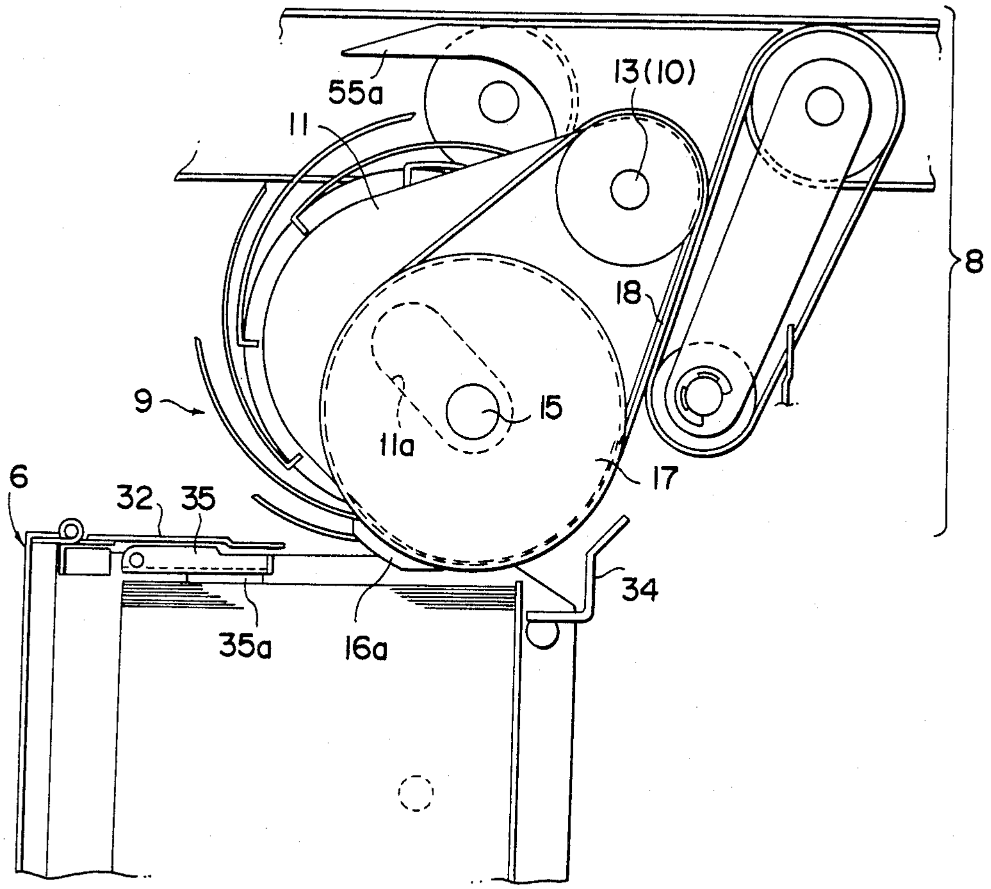
Figure 4:
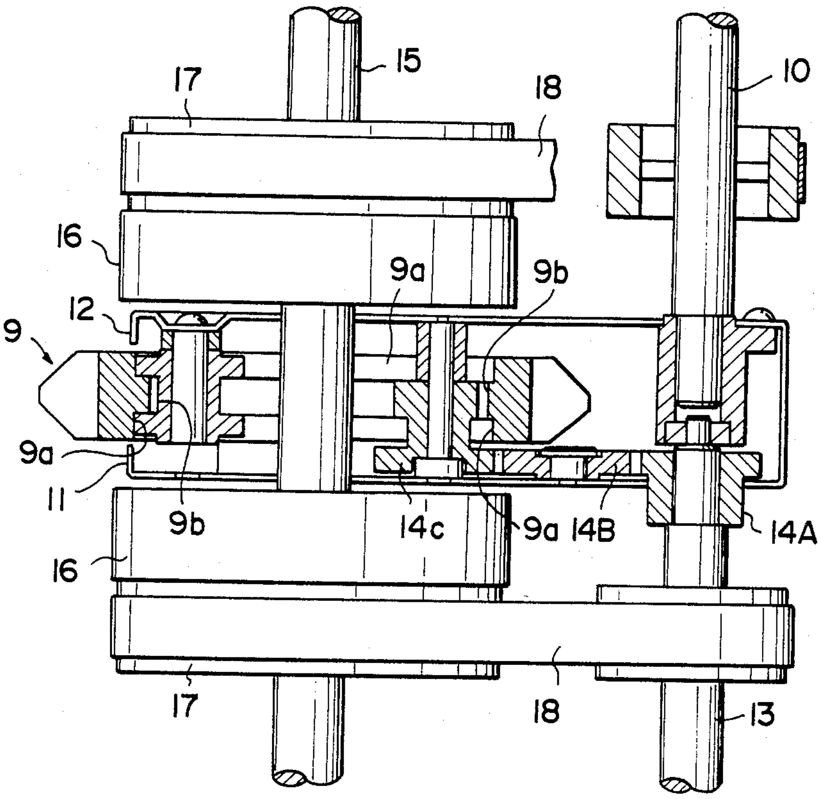
FIG. 4 is a cross-sectional view showing a main portion of the note transfer mechanism shown in FIG. 3.

The note transfer mechanism 8 will now be described with reference to FIGS. 3 and 4. A frame-like accumulating wheel holding member 11 is integrally attached to an accumulating wheel oscillating shaft 10 which is rotated reciprocatively by a driving source arranged in the machine body 1, three accumulating wheel guides 12 are rotatably supported on the accumulating wheel holding member 11 and the inner circumferential face 9*a* of the accumulating wheel 9 is brought in contact with the guides 12 so that the accumulating wheel 9 is supported. A part of the inner circumferential face 9*a* of the accumulating wheel 9 is formed into an internal gear 9*b* projecting inward. A rotating force is given to this internal gear 9*b* from a gear driving shaft 13 which is coaxial with the accumulating wheel oscillating shaft 10 and is rotatable relative to the accumulating wheel holding member 11, through gears 14A, 14B and 14C. An elongated opening 11*a* is formed on the accumulating wheel holding member 11 to extend along the oscillation direction thereof and a rotary shaft 15 intersecting the oscillation plane at a right angle is inserted in this elongated opening 11*a*. Rotatable attracting drums 16 each having an attracting head 16*a* for sucking notes is integrally attached to this rotary shaft 15. In an embodiment illustrated in FIG. 4, two attracting drums 16 are arranged on both the sides of the accumulating wheel 9. Feed belts 18 are arranged on both the sides of the attracting drums 16 and are drived by pulleys 17 rotated by the rotary shaft 15 to deliver notes sucked by the attracting drums 16 to the note circulating delivery passage 3 or to guide and deliver the notes from the note circulating delivery passage 3 toward the accumulating wheel 9.

In the above-mentioned structure, if the accumulating wheel oscillating shaft 10 is rotated or swung to retract the accumulating wheel 9 upward, the initial position described hereinafter is attained.

A stacker supporting device 19 shown in FIG. 5 is arranged so that the note boxes 4 through 8 can be drawn out from the machine body 1 in both the directions. This stacker supporting device 19 will now be described. Both the outer side plates 21 are supported on the machine body 1 through a slide rail 20 (for example, a sliding device proposed by the applicant in Japanese Utility Model Application No. 165295/79) so that the outer side plates 21 can be drawn out in both the directions. Both the inner side plates 22 are vertically movably inserted on the inner sides of these outer side plates 21. A plurality of arms 23 are turnably attached to each outer side plate 21, and the top ends of the arms 23 are connected through guide shaft 25 and pin 25*a* supported movably in the draw-out direction by a guide supporting member 24 integrally attached to the outer face of the inner side plate 22, whereby a parallel link mechanism is constructed. Each arm 23 is inclined slightly in the direction opposite to the draw-out direction with respect to the vertical line in the state where both the outer plates 21 are contained in the machine body 1, and a handle 26 projecting outward is integrally attached to one arm 23 located in the vicinity of the draw-out direction. These arms 23 and handles 26 are arranged on both the sides, respectively, to extend in directions opposite to each other.

Buffer plates 28 supported by spring 27 are arranged above the inner side plate 22, and the number of the buffer plates 28 corresponds to the number of the boxes 4 through 7. Projections 29 formed on the outer side faces of the boxes 4 through 7 are placed and supported on the buffer plates 28. The movement (positioning) of the boxes 4 through 7 in the draw-out direction is restricted by a positioning member 30 inserted between both the inner side plates 22.

Figures 5A, 5B:
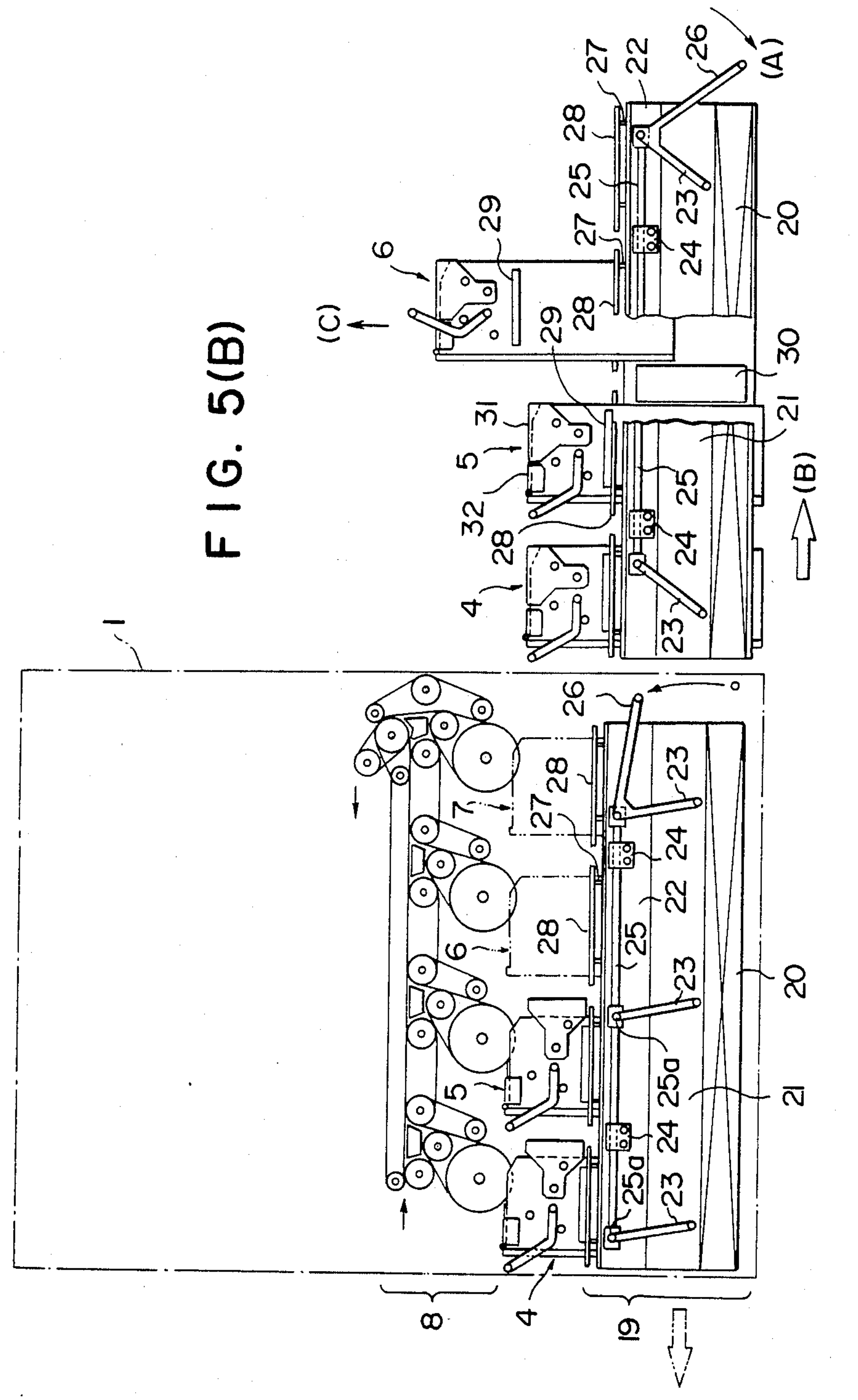
FIGS. 5A and 5B are side views for showing a structure of a stacker supporting device for supporting note boxes of the automatic money depositing and disbursing machine.

In the above-mentioned structure, if the handle 26 is pushed down in the direction (A), the boxes 4 through 7 supported on the stacker supporting device 19 are slightly lifted up, and then, as shown in FIG. 5B, the arms 23 are greatly inclined in the draw-out direction and brought down. Incidentally, the degree of the descending movement is determined by an appropriate stopper mounted on the inner side plate 22 or by contact of the lower end of the inner side plate 22 with the bottom of the outer side plate 21.

Figure 6:
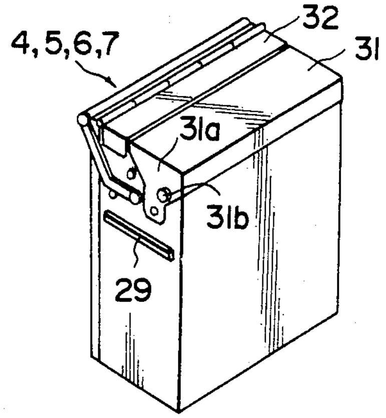
FIG. 6 is a perspective view showing one of the note boxes.
Figure 7B:
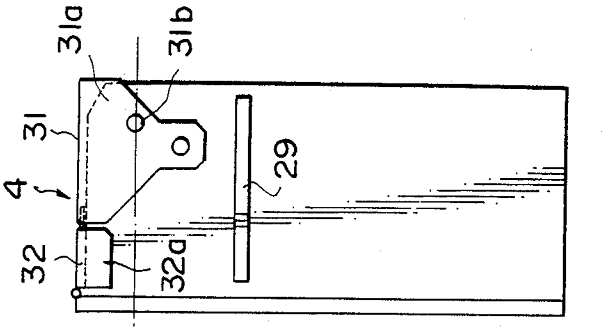
FIGS. 7A and 7B are side views showing the note boxes in FIG. 6.
Figure 7A:
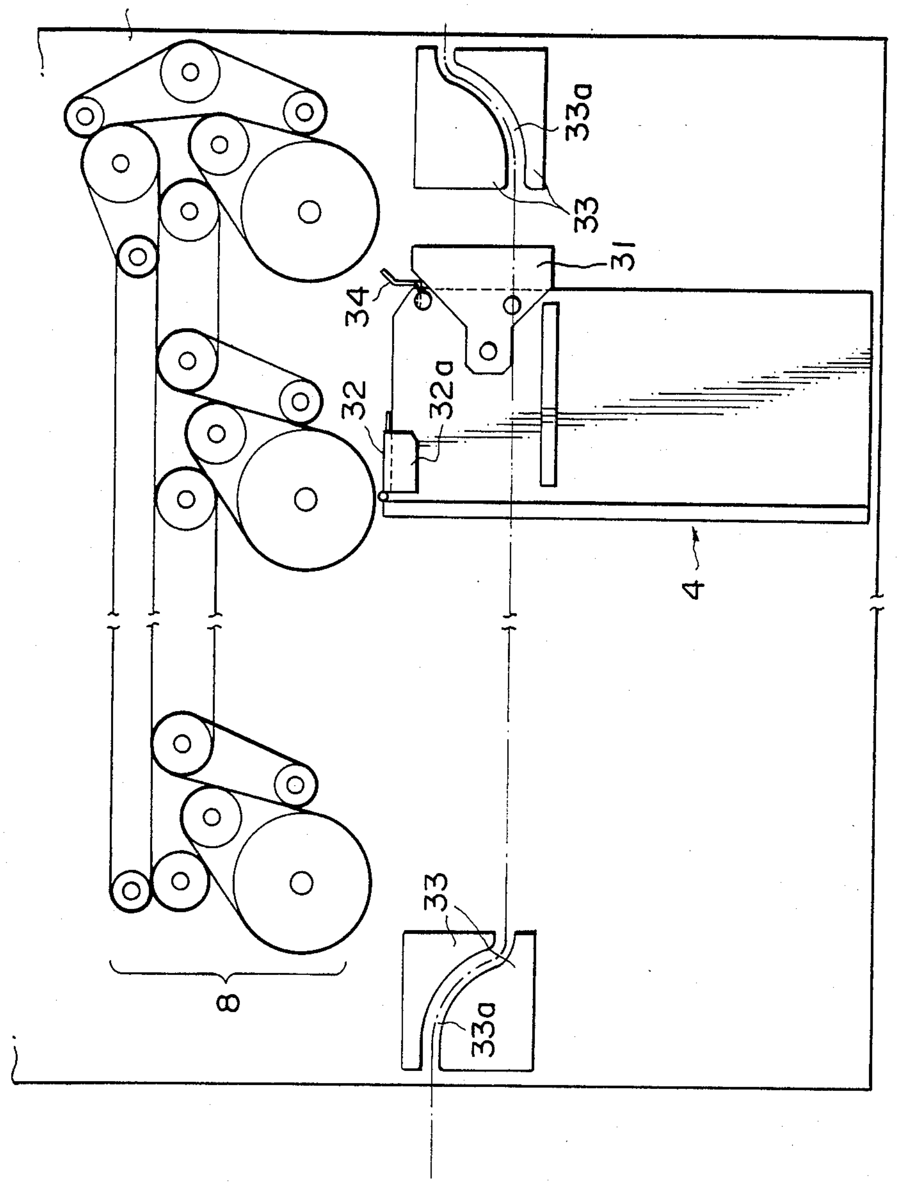

The structures of the boxes 4 through 7 will now be described. The upper opening of each of the boxes 4 through 7 is opened and closed by a rotatable front lid 31 and a pressing lid 32, as shown in FIG. 6. A guide roller 31*b* is formed on a side plate portion 31*a* of the front lid 31. When each of the boxes 4 through 7 is charged inwardly of an opening and closing cam 33 by guiding of the guide roller 31*b* to an opening and closing groove 33*a* of the opening and closing cam 33 projecting inwardly of the end portion of the machine body 1, as shown in FIG. 7A, the front lid 31 is opened, and when each box is drawn out outwardly of the opening and closing cam 33, the front lid 31 is closed, as shown in FIG. 7B. A stopper 34 is turnably attached to the upper portion of each of the boxes 4 through 7, and the stopper 34 is normally located at a position apart from the opening of the box by a spring as shown in FIG. 3. The stoppers 34 are connected to the driving source of the machine body 1 at the time of completion of delivery of notes and are turned, as indicated by broken lines on the left side of FIG. 3, so that they press the notes in the boxes 4 through 7, and when notes are accumulated, the stoppers are projected into the openings of the boxes to guide notes.

Figures 8A, 8B, 8C, 8D:
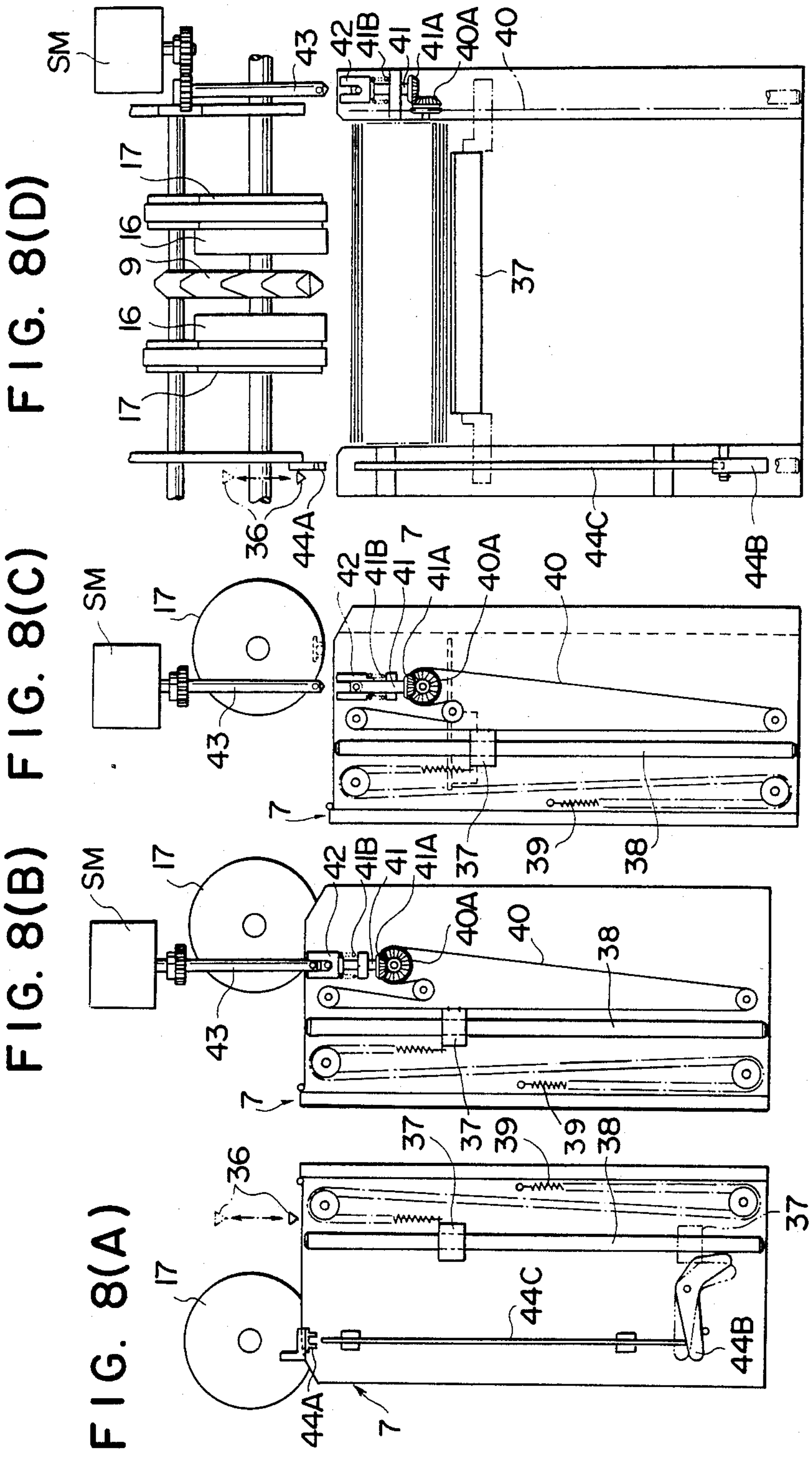
FIGS. 8A through 8D are views showing an internal structure of the note boxes shown in FIG. 6.

An operation plate 35 is slightly turnably attached to a side plate portion 32*a* of the pressing lid 32, and a friction member 35*a* for contact with accumulated notes is attached inwardly of the operating plate 35. The position of the operation plate 35 is detected by upper surface detecting sensors 36, such as micro-switches, mounted in the vicinity of the upper portion of each of the boxes 4 through 7 as shown in FIG. 8. The sensors 36 detect whether the uppermost position of the notes accumulated in the boxes (the position where the uppermost note can be sucked and fed by the attaching drum 16) is in a predetermined position.

A pressing member 37 for pushing up notes is arranged in each of the boxes 4 through 7. As shown in FIG. 8, the pressing member 37 is supported vertically movably along a guide shaft 38, and the pressing member 37 is always urged upward by a spring 39. A chain 40 connected to a bevel gear 40*a* is attached to the pressing member 37. Another bevel gear 41*a* which meshes with the bevel gear 40*a* is attached to an adjustment shaft 41 at the lower end thereof, and at the upper end of the adjustment shaft, a joint member 42 is provided so that it is slidable in a direction of axis of the adjustment shaft, but is fixed in a direction of rotation. A driving connection shaft 43 which is an output shaft of a pulse driven motor (namely, a so-called stepping motor or pulse motor) SM is inserted in the joint member 42 at the upper end of the adjustment shaft 41 to vertically move the pressing member 37 to be set in a position. In other words, the upper surface of the notes supported on the pressing member 37, that is, the position where the friction member 35*a* contacts the notes is adapted to be adjusted. The above-mentioned insertion is made by upwardly lifting each box 4 to 7 within the frame 1 by the stacker supporting device 19. A spring 41*b* is intervened between the adjustment shaft 41 and the joint member 42 to ensure that a complete insertion can be made by the driving connection shaft 43.

A fullness detecting mechanism is provided to be actuated by the pressing member 37 when a quantity of notes which are accumulated in each box 4 to 7 is full (more precisely, when the notes are accumulated more than the difference between the maximum possible quantity of accumulated notes and the maximum possible quantity of notes received at one transaction). That is, when the pressing member 7 is moved toward a lower position within each box 4 to 7, a fullness detecting lever 44B is actuated by the pressing member 37 to be swung, and this swinging movement causes a sensor actuating plate 44*c* to upwardly move and thereby to actuate a fullness detecting sensor 44A (hereinafter referred to as a fullness sensor) attached to the frame 1.

A mechanism for monitoring a quantity of notes accumulated in the boxes and operations for initial setting of the quantity of notes according to the present invention will now be described with respect to items "Summary of Operation of Automatic Money Depositing and Disbursing Machine", "Depositing Treatment", "Receiving Treatment" and "Disbursement Treatment" with reference to FIGS. 9 through 13.

SUMMARY OF OPERATION OF AUTOMATIC MONEY DEPOSITING AND DISBURSING MACHINE

Figure 9A:
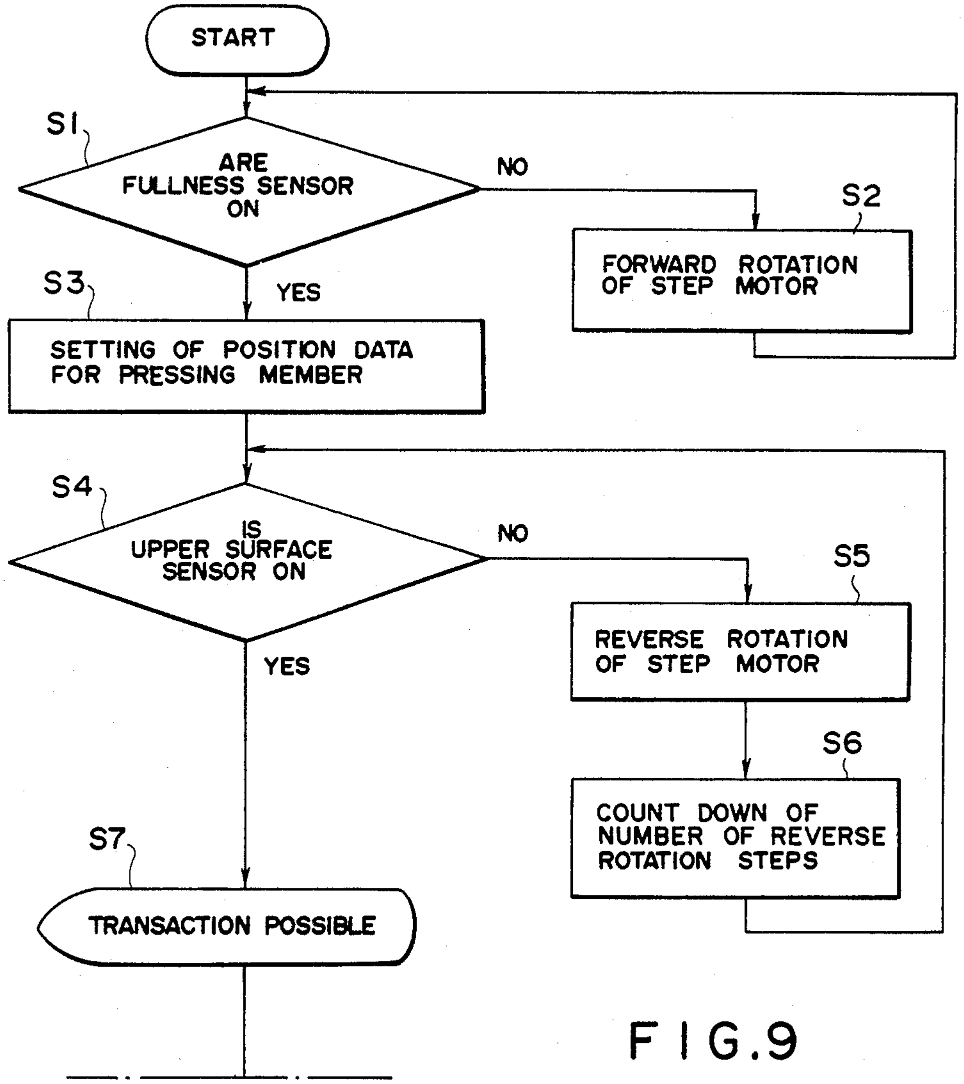
FIGS. 9, 9A, and 9B are flow charts showing steps of diagrammatical operations of the automatic money depositing and disbursing machine.
Figure 9:
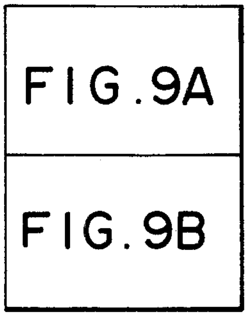
Figure 9B:
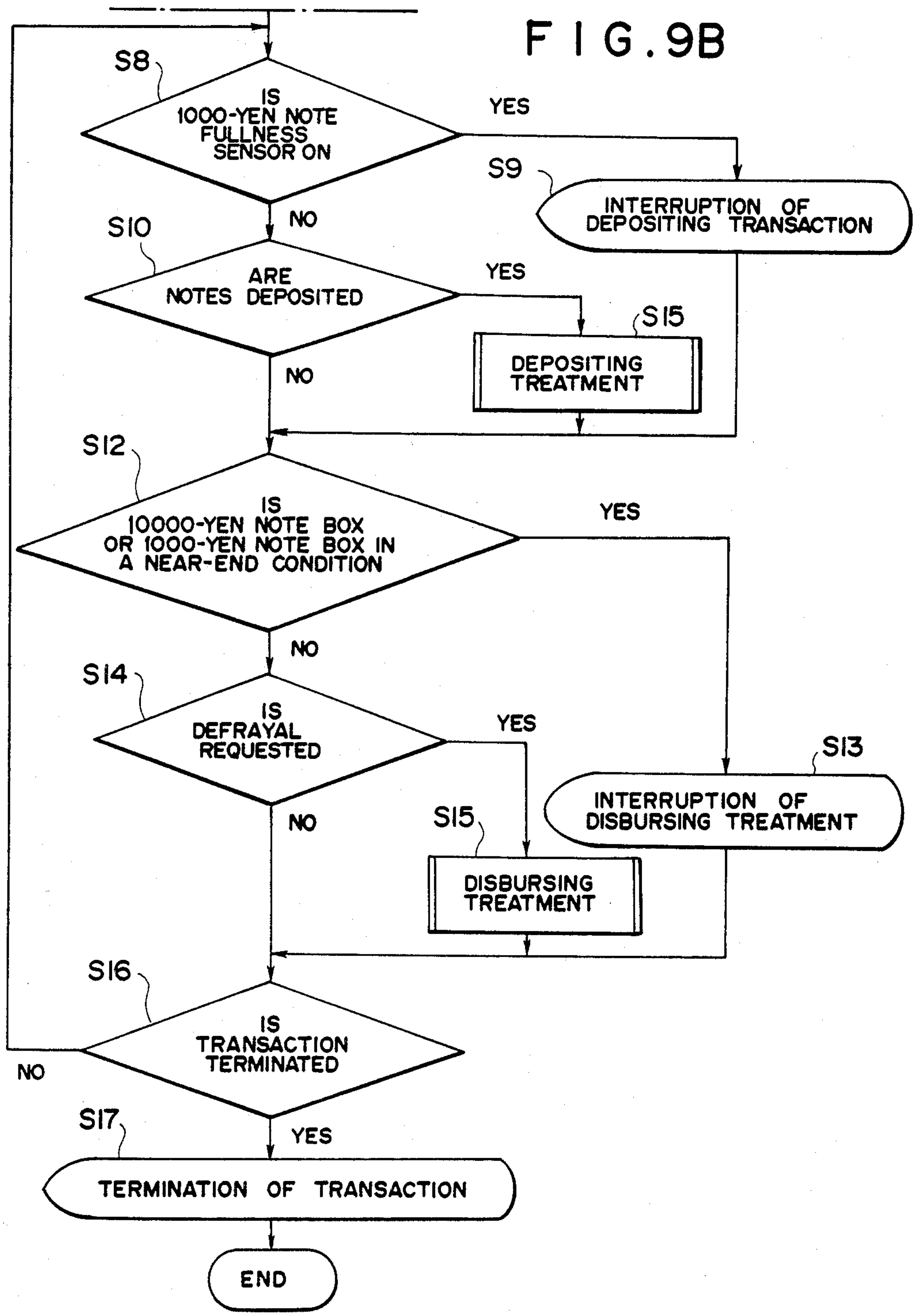

In a bank or the like, treatments are carried out along the flow of FIG. 9 from starting of the automatic money depositing and disbursing machine to completion of the operation thereof. The explanation on operations will start with an initial setting operation after each box is charged in a position in the frame 1, as shown in FIG. 5A.

Step 1 (hereinafter abbreviated to "S1")

It is checked whether the pressing member 37 in each box 4 to 7 is located in a full position by the fullness sensor 44A.

S2:

In the case where the fullness sensor 44A is not on, that is, when the pressing members 37 is not located in the full position and the sensor actuating plate 44C does not actuate the fullness sensor 44A, the pulse driven motor SM (hereinafter referred to as motor) is driven to be rotated forwardly until the fullness sensor 44A is turned on.

The motor SM is of such a construction that when the motor SM is driven to be rotated forwardly, the pressing member 37 is downwardly moved and when the motor SM is driven to be rotated reversely, the pressing member 37 is upwardly moved.

S3:

Since the position of the pressing member 37 when the fullness sensor 44A is turned on is always constant and can be found in design, the data for position (for example, numerical valve 1500) is memorized in a memory (a position data memory section) in the form of a up/down counter.

S4:

After the position data is set, it is checked whether the position of the uppermost surface of the note is in a position by the upper surface detecting sensor 36.

S5:

When the upper surface detecting sensor 36 is not on, that is, when the uppermost note is not in a position where the uppermost note is sucked and transferred by the suction drum 16 and the upper most surface detecting sensor 36 is not actuated through the operation plate 35, the motor SM is reversely driven to cause the pressing member 37 to move upwardly.

S6:

The value for position data of the pressing member 37 stored in the memory is reduced by the step member for reverse pulses by which the motor SM is reversely driven in the step of S5.

Furthermore, each step of S4 through S6 is carried out until the upper surface detecting sensor 36 is turned on.

S7:

After the position data of the pressing member 37 is set and corrected, the transaction will be in an allowable condition and then operations are started.

Furthermore, the quantity of notes are always, but indirectly grasped through the position data of the pressing member 37.

S8:

It is checked whether a depositing note box 4 (designated D.ST) within boxes 4 to 7 for accumulating a group of notes which are not re-used within deposited notes is full by the fullness sensor 44A.

S9:

In case where the depositing box 4 is full, the transaction for deposit is stopped since there is no capacity for accumulating the deposited notes.

S10:

In case where the depositing box 4 is not full, it is judged as to whether the depositing treatment is instructed by a customer.

Figure 10C:
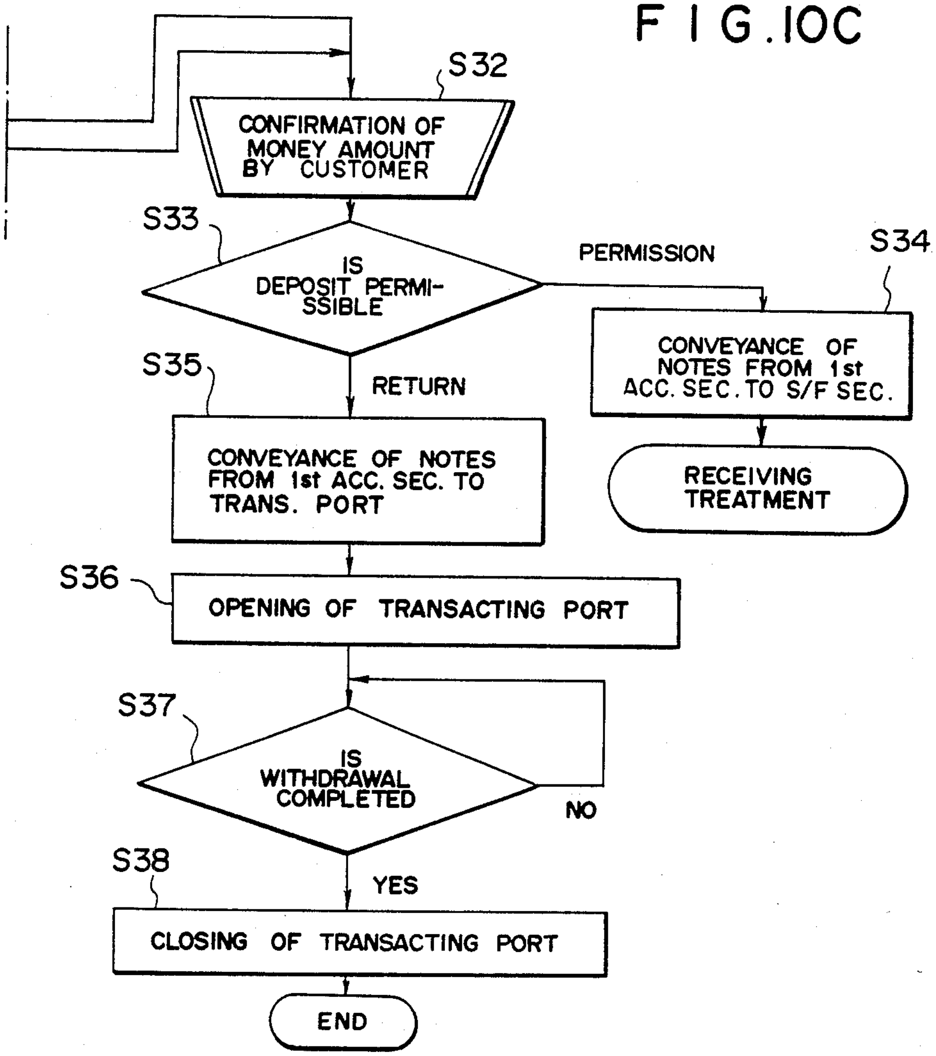
FIGS. 10, 10A, 10B, 10C, 11, 11A, 11B, 12, 12A, and 12B are flow charts showing steps for depositing, receiving and disbursing of notes.
Figure 10:
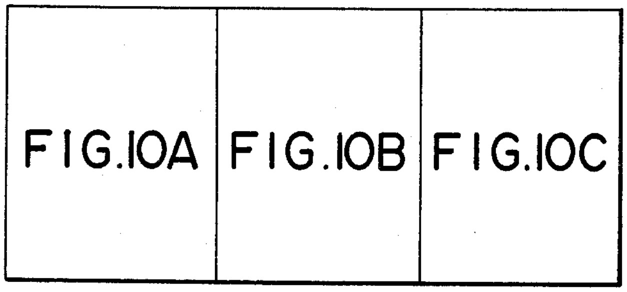
Figure 10A:
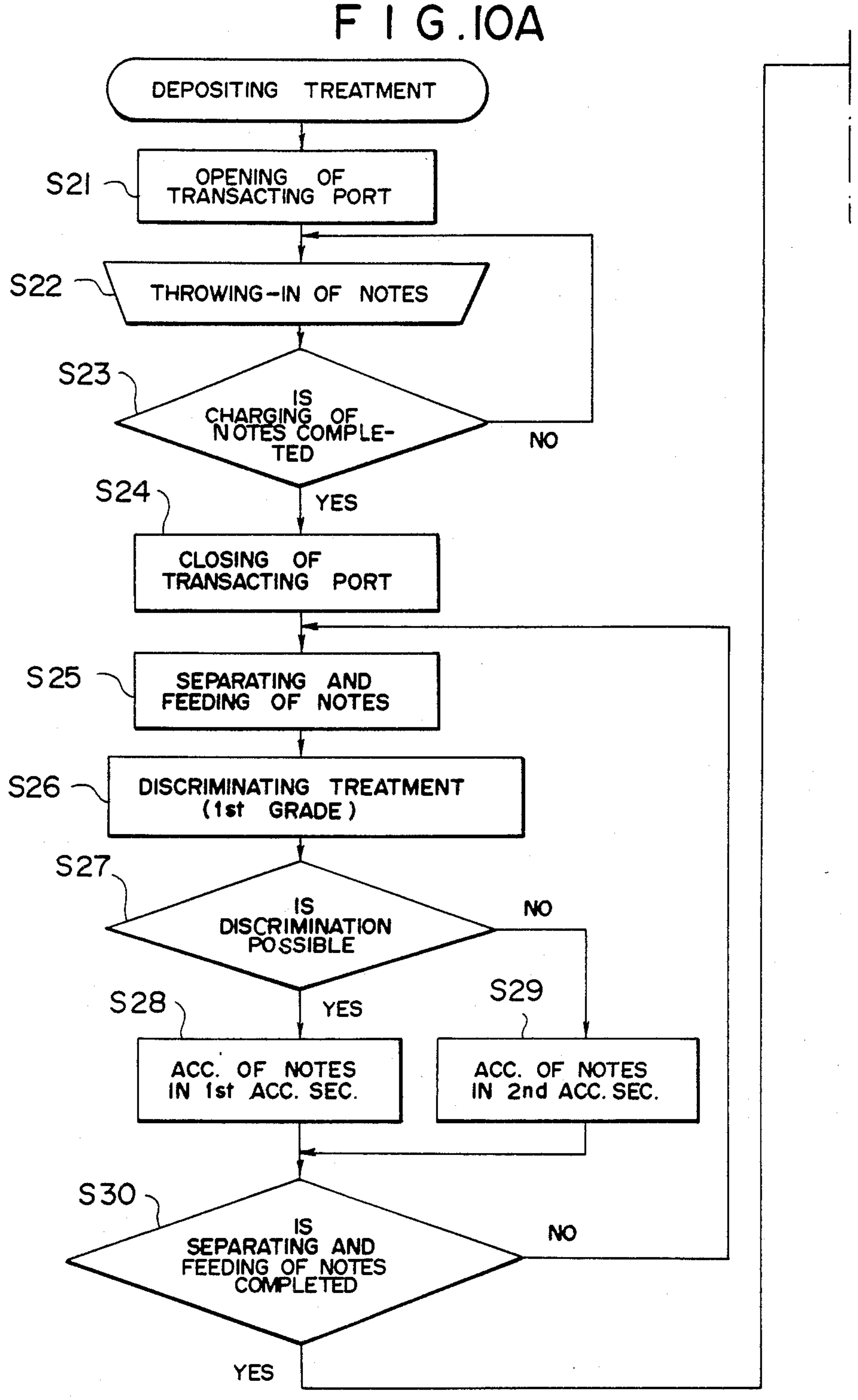
Figure 10B:
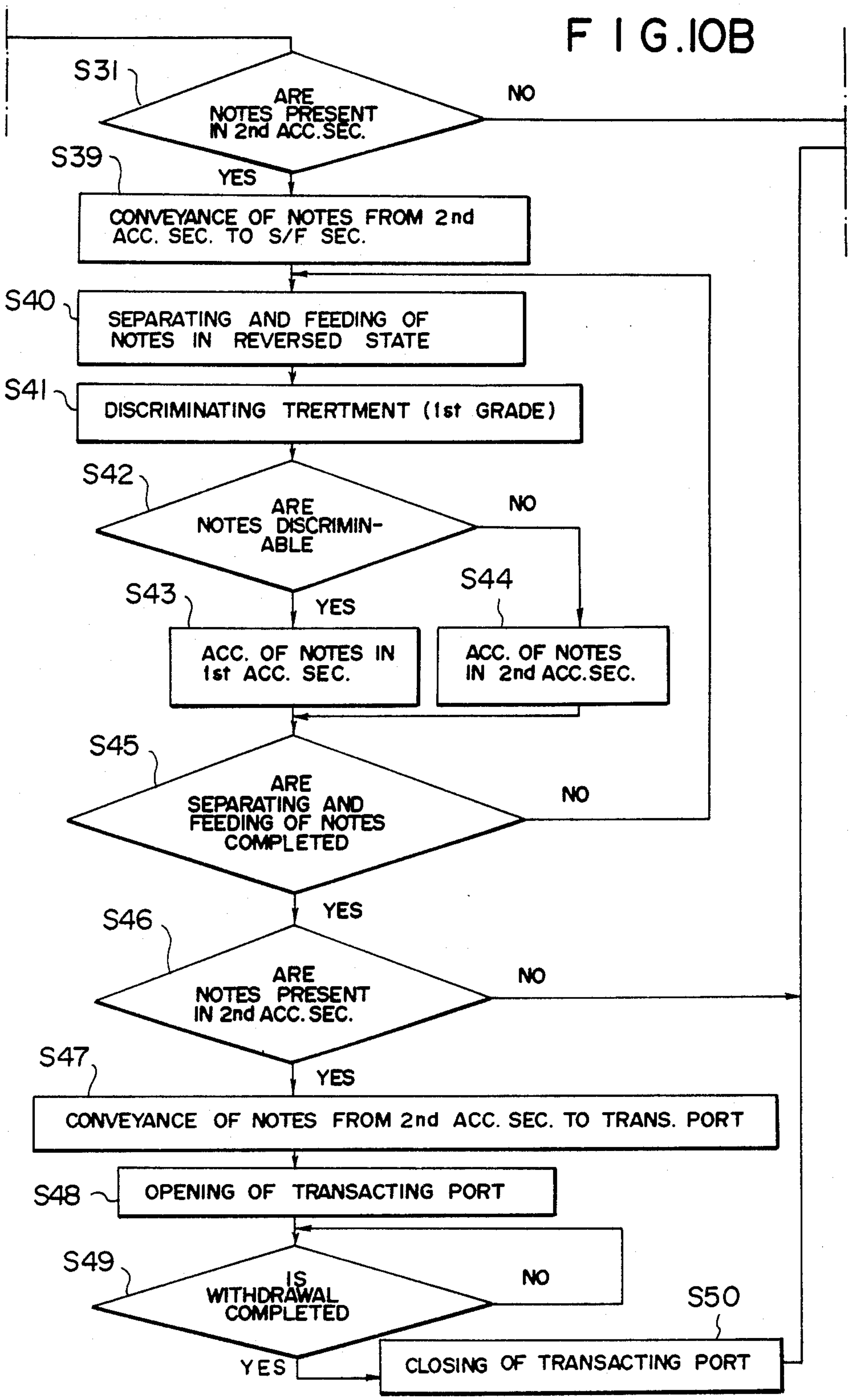
Figure 11:
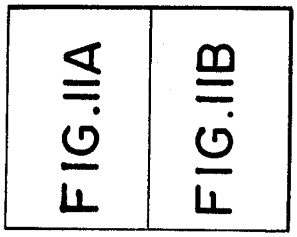
Figure 11B:
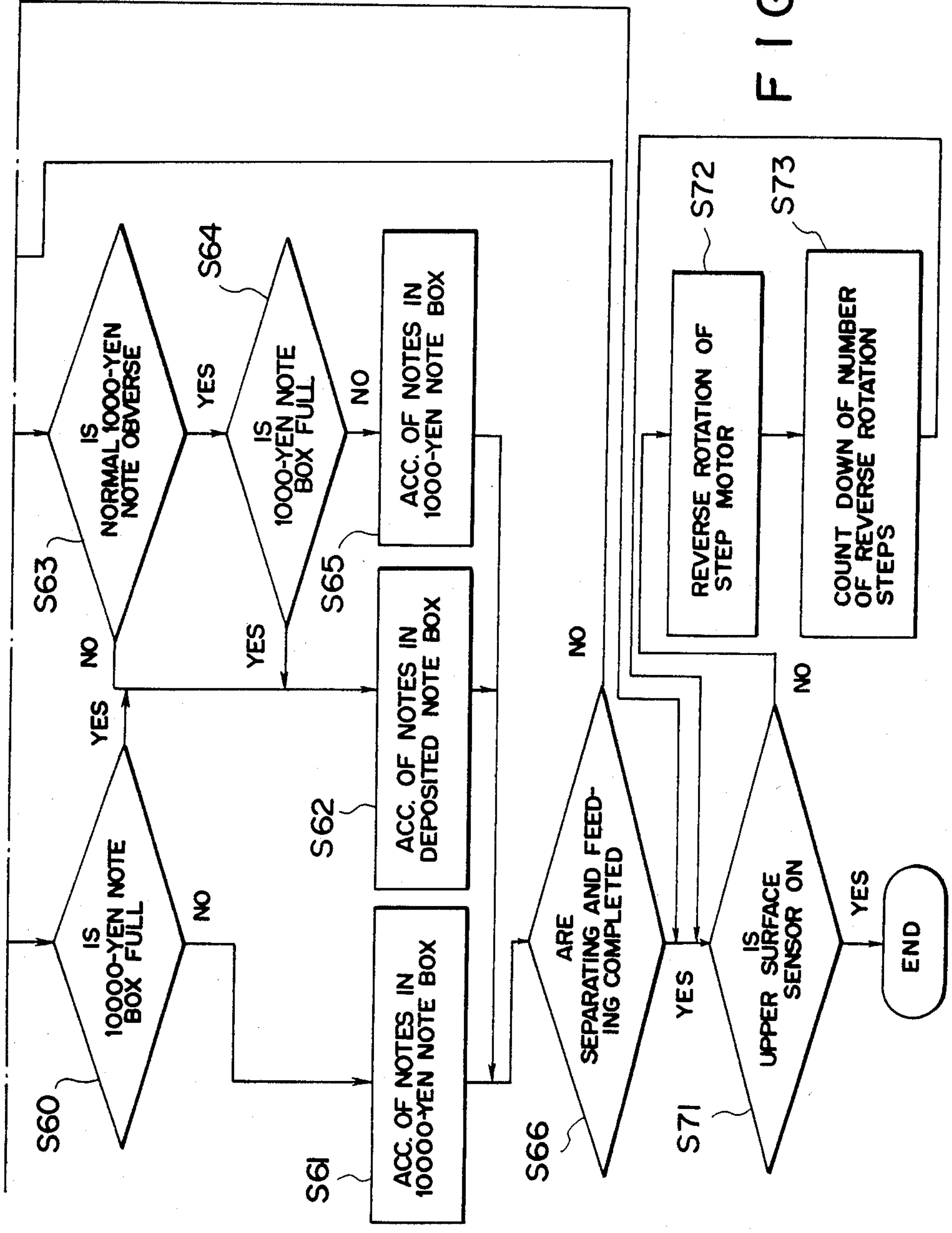
Figure 11A:
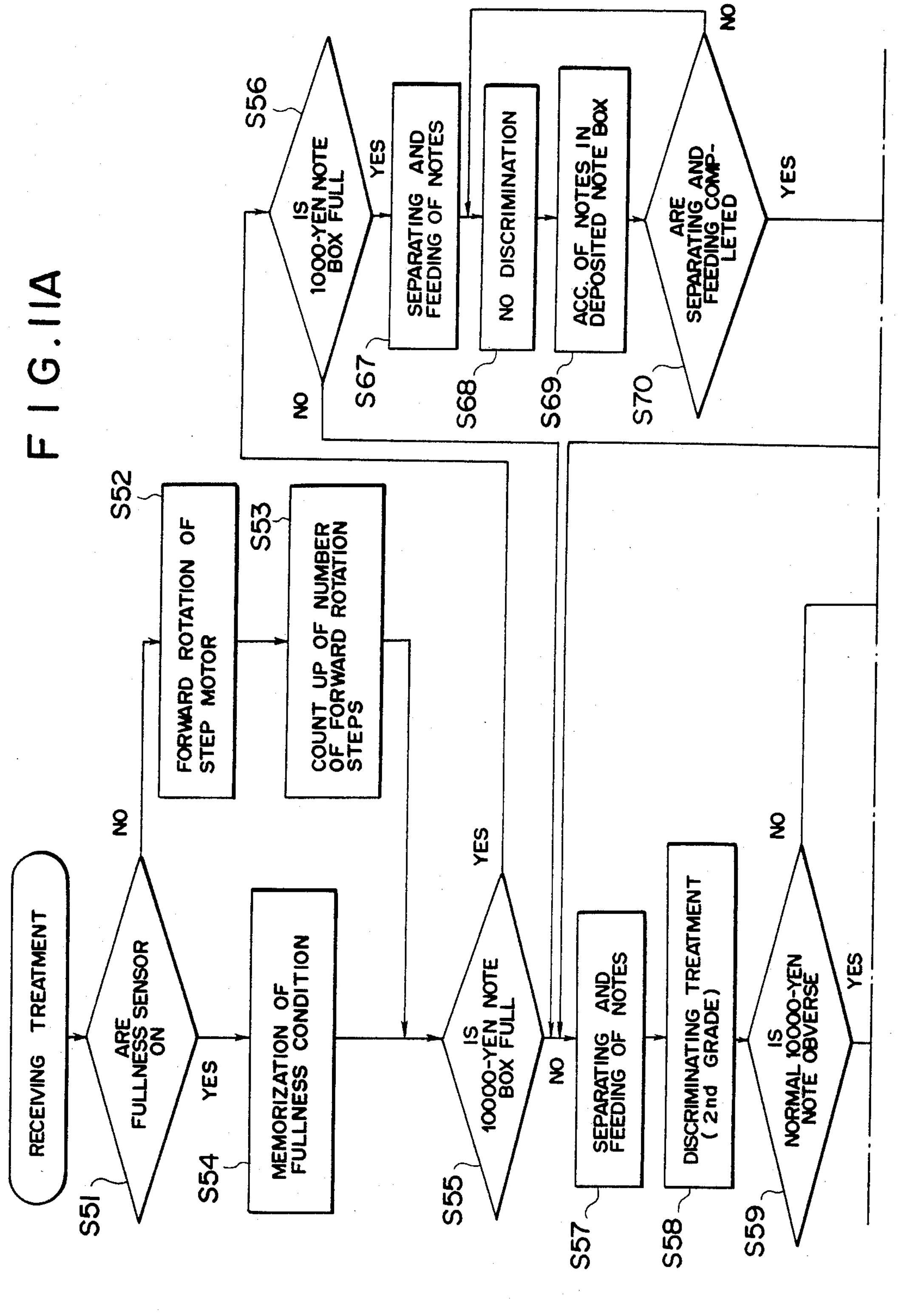

S11:

In case where the depositing treatment is instructed, treatments are carried out as shown in FIGS. 10 and 11, described hereinafter.

S12:

In case where the depositing treatment is not instructed, in case where the depositing treatment is completed, or in case where the depositing treatment is stopped, it is judged as to whether either one of the 10,000-yen note depositing and disbursing box 7 (designated M.ST) and the 1000-yen note depositing and disbursing box 6 (designated S.ST) is in a near-end condition in accordance with contents stored in the memory (position data memory) provided for each box 6, 7. For example, if the position data (numerical value) stored in the memory becomes less than 50, it is judged as a near-end condition.

S13:

In case where it is judged as to whether either one of boxes 6 and 7 is in a near-end condition, disbursing treatment is stopped since the disbursing treatment cannot always be made in accordance with a request by a customer.

S14:

In case where neither of boxes 6 and 7 are in a near-end condition, it is judged as to whether the disbursing treatment is instructed by the customer.

Figures 12, 12A, 12B:
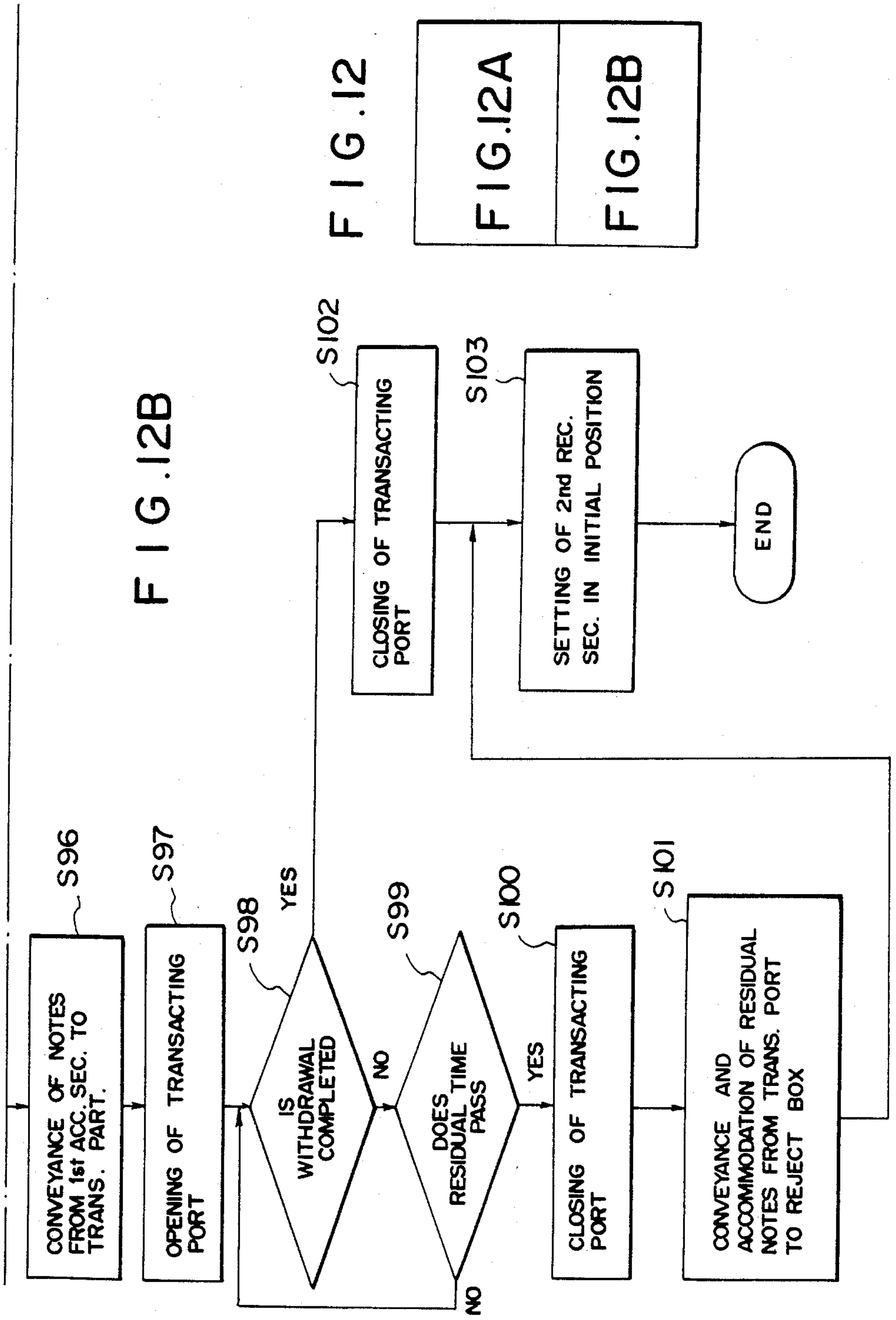
Figure 12A:
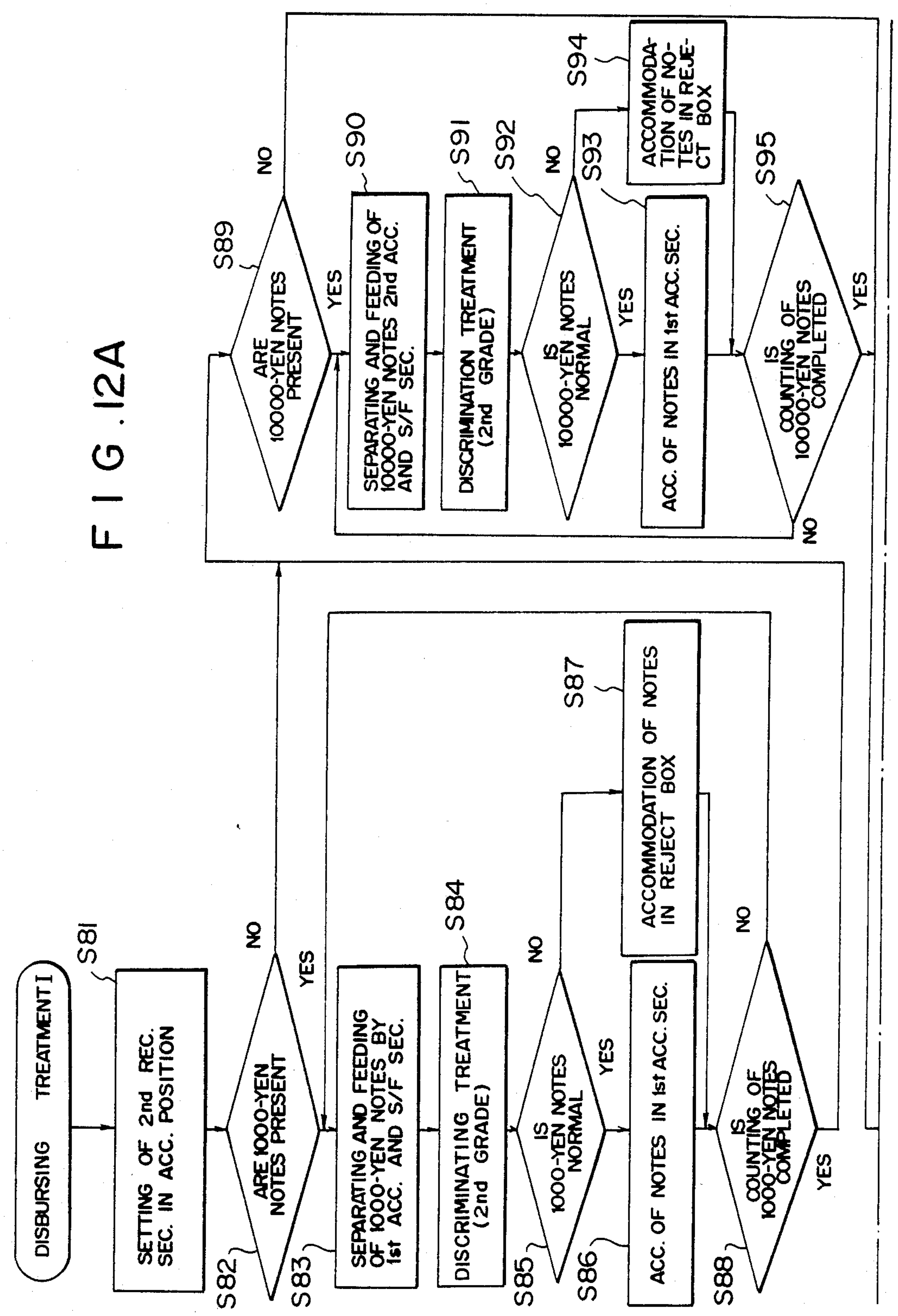
Figure 13:
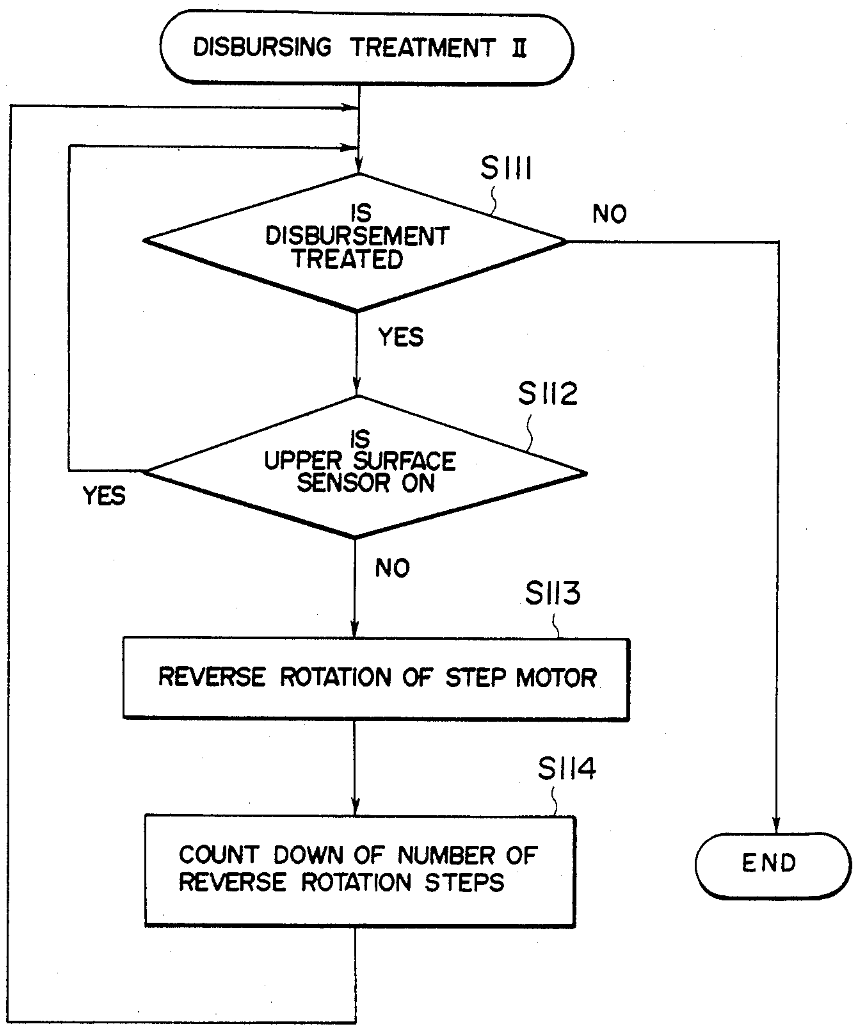
FIG. 13 is a flow chart showing steps at the time of disbursing notes.

S15:

In case where the disbursing treatment is instructed, treatments as shown in FIGS. 12 and 13 are carried out described hereinafter.

S16:

While the transaction is allowable, the steps S8 through S15 are repeated.

S17:

The transaction is terminated when the bank is closed, the supplement of disbursing notes is made or the deposited notes are discharged to be arranged.

POSITION TREATMENT

When a customer charges notes from a transacting port 2, treatments are carried out along the flow shown in FIG. 10 (or FIG. 11).

S21:

When the customer gives a depositing instruction by depressing a depositing button or the like, the transacting port 2 is opened.

S22:

When the customer throws notes into the transacting port 2, the lower ends of the notes are brought in abutting contact with a lower shutter *2a* and are retained in the state slantly piled along a guide *2b*.

S23:

Then, the customer gives an instruction of completion of charging.

S24:

The shutter of the transacting port 2 is closed.

S25:

The lower shutter *2a* is retreated, and the notes are guided in a separating feed section 45. The separating feed section 45 is actuated to separate the notes one by one and feed out the notes. In a running correcting section 46, slant delivery of the notes is corrected by belts 46 and the notes are fed into a discriminating section 47.

S26:

In the discriminating section 47, the notes fed one by one are checked. The discriminating section has the following discriminating functions.

(a) A photo-pattern is discriminated by utilizing transmitted light.

(b) A photo-pattern is discriminated by utilizing reflected light.

(c) A magnetic pattern is discriminated by a magnetic head.

(d) Double feeding is detected by utilizing transmitted light.

(e) Double feeding is detected by detecting the thickness by mechanical means.

(f) The note length is detected by utilizing signals formed by intermittent light rays.

(g) Slant feeding is detected by utilizing signals formed by intermittent light rays.

(h) Proximate feeding (abnormal approach of notes fed in succession) is detected by utilizing signals formed by intermittent light rays.

In the present embodiment, the discriminating functions (a) through (h) are called "discriminating functions of the first grade", and among the discriminating functions of the first grade, the functions (b) and (d) through (h) are called "discriminating function of the second grade".

The discriminating function (c) is to detect a minute difference of the characteristic among notes, and it is considered that the life of the member participating in this function is shorter than the lives of other members. Accordingly, the member for the discriminating function (c), which is readily worn away by checking of notes, is not actuated in the present embodiment while the discriminating operations of the second grade are performed. Since the front and back sides of a note cannot be discriminated by the function (a), the member performing the function (a) is not actuated at the time of discrimination of the low grade.

S27:

In the discriminating section 47, the discriminating operations of the first grade are carried out, and if the kind of notes or the like can be discriminated (the notes are normal), the operation of the step S28 is performed and if discrimination is impossible (the notes are abnormal notes), the operation of the step S29 is performed. More specifically, a distributing fork 48*a* of a first distributing section 48 is changed over, and notes are distributed into a first accumulating section 50 or second accumulating section 51 through a distributing fork 49*a* of a second distributing section 49.

S28:

Normal deposited notes are fed into vanes of an accumulating wheel 50*a* of the first accumulating section 50 and are accumulated on the accumulating wheel 50*a* by a gathering plate 50*b* in the state erected as shown in FIG. 1.

S29:

The note judged as being abnormal is accumulated by the accumulating wheel 51*a* and gathering plate 51*b* of the second accumulating section 51.

S30:

The presence of absence of notes is detected in the separating feed section 45, and when notes are left in the section 45, the operations of the step S24 through S30 are repeated, and when all the notes are delivered out (the section 45 becomes empty) and the operations of the steps S25 through S29 are completed, the operation of the step S31 is carried out.

S31:

It is checked whether or not a note is present in the second accumulating section. In other words, it is checked whether or not an abnormal note is included in the deposited notes and is accumulated in the second accumulating section 51. In the case where all the notes are normal, the operation of the step 32 is carried out. In the case where an abnormal note is present, the flow is automatically shifted to the step S39.

S32:

The customer confirms the amount of money (in the discriminating section, the amount of money added at every checking and the total amount is displayed in the vicinity of the transaction port 2, though the explanation is omitted).

S33:

The customer checks the displayed amount of money, and a permission of deposition is given by depressing a depositing button or the like.

S34:

The notes accumulated in the first accumulating section 50 are fed to the separating feed section 45 through the following operations. Namely, an opening and closing plate 51*c* mounted on a delivery passage laid out from the first accumulating section 50 to the second accumulating section 51 and the gathering plate 51*b* of the first accumulating section 51 are horizontally turned and the opening and closing guide 2*c* of the transacting port 2 is opened as indicated by a chain line in FIG. 1, whereby the notes are moved to the transacting port 2 by the lower shutter 2*a* and guide 2*b*. Then, the opening and closing guide 2*c* is closed and the lower shutter 2*a* is opened, and the notes are fed to the separating feed section 45 and the receiving treatment (described hereinafter) is carried out along the flow shown in FIG. 11.

S35:

If the customer wishes return of notes and an instruction is given by depressing a return button or the like at the step S33, the notes are fed to the transacting port 2 as at the step 34.

S36:

The shutter of the transacting port 2 is opened, and the notes are returned.

S37:

Withdrawal of notes is checked by a sensor or the like arranged on the transacting port 2, and the transaction is completed.

S38:

The shutter of the transacting port 2 is closed, and the note returning treatment is completed.

S39:

When it is detected at the step S31 that abnormal notes are left in the second accumulating section 51, checking is conducted again by an abnormal note detection signal from the discriminating section 47. Incidentally, abnormal notes accumulated in the second accumulating section 51 are in the reversed state. Namely, if the notes are charged with the front face being on the front side, they are reversed so that the back face is on the front side. Checking is conducted again in this reversed state, and as described above with respect to the step S34, the notes are delivered to the separating feed section 45 through the transacting port 2.

S40:

The reversed notes, discrimination of which is impossible, are separated one by one by the separating feed section 45 and fed into the discriminating section 47.

S41:

The discrimination of the first grade is carried out again by the above-mentioned discriminating functions (a) through (h).

S42:

The notes are sorted by changeover of the distributing forks 48*a* and 49*a* of the first and second distributing sections 48 and 49 according to whether discrimination is possible or impossible.

S43:

Normal notes are accumulated in the first accumulating section 50.

S44:

Abnormal notes are accumulated in the second accumulating section 51.

S45:

The presence or absence of notes is detected in the separating feed section 45, and completion of the separating feed operation is confirmed.

S46:

It is checked whether or not notes (abnormal notes) are accumulated in the second accumulating section 51, and if no abnormal note is accumulated in the section 51, the flow is returned to the step S32 and the treatment is carried out along the above-mentioned flow.

S47:

When notes are accumulated in the second accumulating section 51, the notes are delivered to the transacting port 2.

S48:

The transacting port 2 is opened and the notes are returned to the customer.

S50:

The transacting port 2 is closed, and the normal notes are treated in the above-mentioned manner along the step S32 and subsequent steps.

RECEIVING TREATMENT

All the notes are charged in the machine body 1 according to the instruction of the customer are normal. Then, the treatment of sorting these notes for utilizing them as notes to be defrayed is carried out.

S51:

If a depositing instruction is given (by depressing a deposition button by the customer), the fullness detecting sensor 44A detects whether or not the 10,000-yen note box 7 or the 1000-yen box 6 shown in FIGS. 1 and 2 is full.

S52:

In case where the boxes 6 and 7 are not full, the connecting drive shaft 43 shown in FIG. 8 is forwardly driven by the motor SM by a quantity, and notes which have been raised up to the position are moved downwardly together with the pressing member 37, so that a space for accumulation is formed as shown in FIG. 3A. The pressing lid 32 and operation plate 35 are turned upward and retreated.

At the same time, the operation of bringing down the accumulating wheel 9 of the note transfer mechanism 8 from the position shown in FIG. 3B to the position shown in FIG. 3A is carried out.

S53:

The number of steps of forward rotation pulse used to forwardly drive the motor SM are added to the memory which stores the position data for the pressing member 37.

S54:

In case where the boxes are full, their detection signals are memorized for boxes 6 and 7, respectively.

S55:

The judgement as to whether the 1000-yen note box 7 is full (the judgement on the contents memorized in S54) is carried out.

S56:

If the 10,000-yen note box 7 is full, it is judged whether or not the 1000-yen note box 6 is full (the content of the storage at the step 54 is checked).

S57:

If at the step S55 or S56 it is judged that at least one of the boxes 6 and 7 is not full, the notes to be allowed for deposition are separated by the separating feed section 45 and fed into the discriminating section 47.

S58:

The discrimination of the second grade mainly for discrimination of kinds of the notes is carried out in the discrimination section 47.

S59:

Among notes allowed for deposition, normal 10,000-yen notes with the front side up are detected, and in case of "YES", the program is shifted to the step S60 and in case of "NO", the program is shifted to the step S63. By the term "normal note" is meant a clean note which has no adhering tape and is not contaminated or damaged even partially and which is suitable as a note to be defrayed. Notes other than normal notes are called "damaged notes" and they are not used again.

S60:

It is judged whether or not normal 10,000-yen notes can be accommodated in the 10,000-yen note box 6, and if another 10,000-yen notes can be accommodated in the box 7 (the box 7 is not full), the operation of the step S61 is performed. If the box 7 is full, the operation of the step S62 is carried out.

S61:

In the case where notes can be accommodated in the box 7, normal 10,000-yen notes with the front side up are delivered from the discriminating section 47 to the second accumulating and separating feed section 8D of the note transfer mechanism 8 by changeover of the fork 48*a* of the first distributing section 48 through third, fourth, fifth and sixth distributing section 52, 53, 54 and 55. A fork 55*a* of the sixth distributing section 55 is changed over as indicated by a chain line in FIG. 3A, and the notes are guided between belts 55*b* and 18 and fed in vanes of the accumulating wheel 9. By rotation of the accumulating wheel 9, the top ends of the notes are caused to fall into abutting contact with the side wall 7*a* of the 10,000-yen note box 7 and the notes are let to fall down in the box 7. At this time, the stopper 34 guides the top ends of the notes and prevents jumping of the notes after falling into the box 7. At this step for accommodating notes in the box 7, the pressing lid 32 and operation plate 35 are turned as shown in FIG. 3A to form an opening in the upper portion of the 10,000-yen note box 7.

S62:

If the 10,000-yen note box 7 is full ("YES" at the step S61), even 10,000-yen notes with the front side up are let to fall into the deposited note box 4 from the discriminating section 47 by changeover of the fork 48*a* of the first distributing section 48 through the third distributing section 52 and first receiving section 8A.

S63:

Of the notes which are judged at the step S59 as being different from 10,000-yen notes with the front side up, 1000-yen notes with the front side up are detected, and in case of "NO", the notes are contained in the deposited note box 4 and in case of "YES", the operation of the step S64 is carried out.

S64:

It is checked whether or not the 1000-yen note box 6 is full, and if the box 6 is full, the operation of the step S63 is carried out and if another 1000-yen notes can be accommodated in the box 6, the operation of the step S65 is carried out.

S65:

In the case where another 1000-yen notes can be accommodated in the box 6, normal 1000-yen notes with the front side up are fed into the first accumulating and separating section 8C through the discriminating section 47, first distributing section 48, third distributing section 52 and fourth distributing section 53 by changing over the distributing fork 54*a* of the fifth distributing section 54 according to the procedure shown in FIG. 3A, and they are left to fall down into the 1000-yen note box 6 from the accumulating wheel 9.

S66:

The operation of selecting normal 10,000-yen notes or 1000-yen notes with the front side up in the above-mentioned manner is repeated, and when any note allowed for deposition is left in the separating feed section 45 and there is not present any note in the separating feed section 45 and the note circulating delivery passage 3, the respective operations are completed.

Incidentally, notes received in the boxes 6 and 7 at the steps S61 and S65 are accumulated with the back side up.

S67:

If it is judged at the step S57 that the 1000-yen box 6 is full, since both the boxes 6 and 7 are full and notes allowed for deposition cannot be used again as notes to be defrayed, only the treatment of receiving notes allowed for deposition is performed. Notes are delivered out from the separating feed section 45.

S68:

The notes are passed through the discriminating section 47 without performing discrimination of the notes.

S69:

All the notes allowed for deposition are accommodated in succession in the box 4 through the first distributing section 48, third distributing section 52 and first receiving section 8A.

S70:

The operation of separating and feeding the notes allowed for deposition is thus completed.

S71:

The initial position of the note transfer mechanism 8 is set. At this operation of setting the initial position, as described hereinbefore, the accumulating wheel 9 of the note transfer mechanism 8 is turned upward and the pressing lid 32 is turned to the horizontal position as shown in FIG. 3B to expose the friction member 35*a* of the operation plate 35 to the interior of the boxes 6 and 7.

Furthermore, the pressing member 37 is moved upwardly by the motor SM and the upper surface of the notes which has been raised up is brought into contact with the friction member 35*a*. At the time, the position of the operation plate 35 is detected by the upper surface detecting sensor 36 and it is checked whether the uppermost surface of the notes is in a position.

Furthermore, since the reject box 5 has a small quantity of accumulation and the usual rate of rejection of notes is very low, the operation plate 35, the upper surface detecting sensor 36, the pressing member 37 and the like can be abbreviated to adopt a method in which the notes are fallen and accumulated in the box.

S72:

If the upper surface detecting sensor 36 is not on, the motor SM is reversely driven to move the pressing member 37 upward.

S73:

The number of steps of reverse rotation pulses used to reversely drive the motor SM in S72 is subtracted from the memory which memorizes the position data of the pressing member 37.

Furthermore, each step of from S71 to S73 is carried out until the upper surface detecting sensor 36 is turned on.

Thus, the depositing treatment and receiving treatment are completed, and therefore the above-mentioned S11 is completed.

DISBURSING TREATMENT

When a customer wishes defrayal of notes from the transacting port 2, the amount of money to be defrayed or the desired kind of notes is confirmed and a disbursement button or the like is depressed. By this instruction, the disbursing (defrayal) treatment I shown in FIG. 12 is performed according to the following steps.

Furthermore, simultaneous with the disturbing treatment I, the adjustment of position of pressing member 37 is carried out by steps in disbursing treatment II shown in FIG. 13.

DISBURSING TREATMENT I

The defrayal of the desired amount of money is performed by using two kinds of notes, that is, 10,000-yen notes and 1000-yen notes

S81:

At first, in the reject box 5, the pressing member 37 is pressed down to the lowermost position by the driving force of the motor SM through the connecting mechanism to increase the capacity of the reject box 5. This operation is called "setting of the accumulation position".

S82:

In the machine 1, it is checked whether or not 1000-yen notes are included in the desired kinds of notes or the total defrayal amount, and if 1000-yen notes are included, the operation of the step S83 is carried out and if 1000-yen notes are not to be defrayed, the operation of the step S89 is carried out.

S83:

In the case where 1000-yen notes are to be defrayed, the back faces of 1000-yen notes contained in the 1000-yen box 6 are drawn out one by one by the attracting drum 16 of the first accumulating and separating feed section 8C, and the 1000-yen notes are delivered into the note circulating delivery passage 3 by the feed belt 18 and fed into the discriminating section 47 through the sixth distributing section 55 and running correcting section 46.

S84:

The second grade discrimination of 1000-yen notes with the front side up is carried out in the discriminating section 47.

S85:

In the case where the notes are less damaged normal 1000-yen notes suitable for defrayal, the operation of the step S86 is carried out, and in the case where the notes are much damaged or double-fed 1000-yen notes not suitable for defrayal, the operation of the step S87 is carried out.

S86:

Normal 1000-yen notes are accumulated in the first accumulation section 50 through the first distributing section 48 and second distributing section 49. The 1000-yen notes are accumulated in the first accumulation section 50 with the front side up.

S87:

The 1000-yen notes not suitable for defrayal are fed into the second receiving section 88 from the first distributing section 48 through the third distributing section 52 and fourth distributing section 53. As described hereinbefore with respect to the step S81, the notes are let to fall down in the reject box 5 where the accumulation position has been set and are accumulated in the reject box 5.

S88:

A necessary number of normal 1000-yen notes are accumulated in succession below the first 1000-yen note by the operations of the steps S83 through S86, and completion of counting of the number of 1000-yen notes is confirmed and the operation of the step S89 is performed.

S89:

It is checked whether or not 10,000-yen notes are included in the notes to be defrayed, and if defrayal of 10,000-yen notes is not necessary, the operation of the step S96 is carried out.

S90:

When defrayal of 10,000-yen notes is necessary, the back faces of 10,000-yen notes contained in the 10,000-yen note box 7 are drawn out one by one by the attracting drum 16 of the second accumulating and separating feed zone 8D, and the notes are fed into the discriminating section 47 through the running correcting section 46.

S91:

In the discriminating section 47, the second grade discrimination of 10,000-yen notes with the front side up is carried out.

S92:

If the notes are less damaged normal 10,000-yen notes suitable for defrayal, the operation of the step S93 is carried out, and if the notes are not suitable for defrayal, the operation of the step S94 is carried out.

S93:

Normal 10,000-yen notes are fed into the first accumulation section 50 as explained hereinbefore with respect to normal 1000-yen, and if 1000-yen notes are already accumulated, the 10,000-yen notes are accumulated in succession on the 1000-yen notes with the front side up.

S94:

The 10,000-yen notes not suitable for defrayal are let to fall down into the reject box 5 from the first distributing section 48 and accumulated in the reject box 5 as at the step S87.

S95:

The operations of the steps S90 through S93 are repeated, and when the necessary number of 10,000-yen notes are accumulated, completion of counting of the 10,000-yen notes is confirmed and the operation of the step S94 is carried out.

S96:

The 1000-yen and 10,000-yen notes accumulated in the first accumulating delivery section 50 are delivered to the transacting port 2 in the state where the 10,000-yen notes are piled on the 1000-yen notes and all the notes are placed with the front side up. More specifically, the gathering plate 51*b* and the opening and closing plate 51*c* are placed at the horizontal posture, and the lower shutter 2*a* is closed as indicated by a solid line in FIG. 1 and the opening and closing guide 2*c* is retreated upward as indicated by a chain line in FIG. 1. In this state, the lower shutter 2*a* is communicated with the transacting port 2. According to the method proposed by the applicant in patent application No. 122642/80, the lower delivery belt 56 is placed at the horizontal posture and the upper delivery belt 57 is placed at the horizontal posture in parallel to the lower delivery belt 56, and the accumulated 1000-yen notes and 10,000-yen notes are delivered to the guide 2*b* of the transacting port 2 in the state gripped between both the belts 56 and 57 and the respective notes are supported on the lower shutter 2*a* and guide 2*b* with the front side up.

S97:

The transacting port 2 is opened.

S98:

When all the defrayed notes are taken away by the customer, this act is confirmed by the detection sensor arranged in the vicinity of the transacting port 2 and in case of "YES", the transaction with the customer is completed and the operation of the step S102 is carried out.

S99:

When the detection sensor detects all or parts of the notes, the timer is started and a certain time is allowed to pass, and when the customer takes away the notes during this time, the flow is returned to the step S98 and the transaction is completed.

S100:

If a certain time has passed without the notes being taken away by the customer, the shutter of the transacting port 2 is closed.

S101:

The lower shutter 2*a* of the transacting port 2 is opened, and the amount of residual notes in the separating feed section 45, running correcting zone 46 and discriminating section 47 (arranged to perform the second grade discrimination) is checked and the notes are discharged into the reject box 5 through the first distributing section 48, third distributing section 52, fourth distributing section 53 and second receiving section 8B. A record of the customer forgetting the notes is made and used as a service material for informing the customer of non-receipt from the bank. Then, the operation of the step 103 is carried out.

S102:

When the transaction is completed at the step S98, the transacting port 2 is closed.

The second receiving section 8B is set at the initial position (refer to the steps S2 and S72), and the operation of the machine body 1 is stopped.

(DISBURSING TREATMENT II)

This disbursing treatment adjusts the pressing members 37 for 1000-yen note box 6 and 10,000-yen note.

S111:

While the disbursing treatment desired by a customer is carried out by S81 through S103 the operation is shifted to S112.

S112:

It is checked whether the upper surface detecting sensor is in an ON condition since the uppermost surface of notes is moved downwardly and note would not be sucked and transferred by the suction drum as notes continue to be transferred from 1000-yen note box 6 or 10,000-yen note box 7 through S83 or S90.

S113:

When the upper surface detecting sensor is turned off, the motor SM is reversely driven to move the pressing member 37 upwardly.

S114:

The number of steps of reverse rotation pulses at S113 is subtracted from the memory.

Thus, while the disbursing treatment continues, S111 through S114 are carried out.

As described above, the disbursing treatments I and II are completed, and therefore the above-mentioned S15 is completed.

Then, as described above, the flow of S8 through S16 shown in FIG. 9 is repeated.

The foregoing is made with reference to the case where one transacting port 2 is formed. Another transacting port 2 as shown on the right side of FIG. 1 may be arranged on the left side symmetrically.

As the foregoing, according to the present invention, since, in the automatic depositing and disbursing machine wherein notes are accumulated into the boxes from the upper openings thereof and transferred from the upper openings, the pressing members for supporting the notes with the notes in the boxes being vertically movable can be set in a position by the drive-type motor and the position data for the pressing member is renewed and memorized by forward and reverse or backward rotation pulses used to drive the pulse driven motor so as to move the pressing member in a position and thereby always monitoring the quantity of notes, the presence of occurrence of near-end condition, or if necessary the presence of occurrence of pre-near-end condition (where near-end condition is near) can be detected without fail, and also the mechanism for connecting the machine frame and the boxes are made simple.

Furthermore, the fullness detecting mechanism is provided for initially setting the position data for the pressing member. The pressing member is moved downwardly until the fullness detecting mechanism is operated and when the fullness detecting mechanism is operated, the fullness position data which can be noticed on a design is memorized in the memory. Consequently, a precise initial setting can be accomplished without previously confining the quantity of notes accumulated in the boxes.

Furthermore, since the uppermost surface of the notes in the boxes is adapted to be detected and, as mentioned above, subsequent to initially setting of a precise position data the uppermost surface of the notes is set in a position and then operation of the automatic depositing and disbursing machine can be started, the quantity of notes in boxes can be completely grasped and the above-mentioned control for detection of near-end condition and transaction can be made.

What is claimed is:

1. An automatic money depositing and disbursing machine in which notes thrown in a transacting port are transferred into a discriminating section to detect the presence or absence of abnormal notes and receive normal notes and at least portions of the received notes are used as notes to be defrayed, which comprises:

(a) at least one pressing member movably supported to be vertically moved toward an upper opening of each note accumulating box, (b) a pulse driven motor connected to the pressing member through a connecting mechanism for vertically moving and setting the pressing member in a position by forward and reverse rotation pulses, (c) a position data memory for renewing memorized position data for the pressing member by adding the forward rotation pulses to the position data or subtracting the reverse rotation pulses from the position data, and (d) a judging section for issuing a near-end signal by the position data for the pressing member memorized in the position data memory when the quantity of notes accumulated in each box becomes less than a previously set quantity of notes.

2. A machine as set forth in claim 1, further comprising:

(e) a fullness detecting mechanism actuated by the pressing member when the quantity of notes accumulated in each box is full, (f) a fullness position data memory for previously memorizing the position data for the pressing member when the fullness detecting mechanism is actuated, and (g) a data setting section for storing the position data memorized in the fullness position data memory into the position data memory by first actuation of the fullness detecting mechanism after each box is charged in the machine.

3. A machine as set forth in claim 2, further comprising:

(h) an upper surface position detecting mechanism for checking whether the uppermost surface position of notes accumulated in each box is set in a position, and (i) a control section for enabling a depositing and disbursing transaction after the position data for the pressing member is initially set by the data setting section and then the pressing member is moved upwardly so that the uppermost surface position of notes is set in a position.

* * * * *